US012231602B2

(12) United States Patent
Nuzman et al.

(10) Patent No.: US 12,231,602 B2
(45) Date of Patent: Feb. 18, 2025

(54) APPARATUS, METHODS AND COMPUTER PROGRAMS FOR PERFORMING ACOUSTIC ECHO CANCELLATION

(71) Applicant: Nokia Technologies Oy, Espoo (FI)

(72) Inventors: Carl Nuzman, Union, NJ (US); Shirin Jalali, Berkeley Heights, NJ (US)

(73) Assignee: Nokia Technologies Oy, Espoo (FI)

(*) Notice: Subject to any disclaimer, the term of this patent is extended or adjusted under 35 U.S.C. 154(b) by 252 days.

(21) Appl. No.: 17/747,110

(22) Filed: May 18, 2022

(65) Prior Publication Data
US 2023/0051021 A1    Feb. 16, 2023

Related U.S. Application Data

(63) Continuation-in-part of application No. 17/393,904, filed on Aug. 4, 2021, now Pat. No. 11,863,702.

(51) Int. Cl.
*H04M 9/08* (2006.01)
*H04R 3/00* (2006.01)
*H04R 3/12* (2006.01)

(52) U.S. Cl.
CPC ............ *H04M 9/082* (2013.01); *H04R 3/002* (2013.01); *H04R 3/12* (2013.01)

(58) Field of Classification Search
CPC .......... H04M 9/082; H04R 3/002; H04R 3/12
See application file for complete search history.

(56) References Cited

U.S. PATENT DOCUMENTS

| | | | | |
|---|---|---|---|---|
| 3,836,734 A | * | 9/1974 | Campanella | H04B 3/23 379/406.05 |
| 4,268,727 A | * | 5/1981 | Agrawal | H04Q 11/04 379/406.08 |
| 6,163,609 A | * | 12/2000 | Makinen | H04B 3/23 379/406.08 |
| 6,816,592 B1 | | 11/2004 | Kirla | |
| 7,346,012 B2 | | 3/2008 | Stopler | |
| 7,545,926 B2 | | 6/2009 | Mao | |
| 9,699,552 B2 | * | 7/2017 | Kuech | H04M 9/085 |
| 10,573,301 B2 | * | 2/2020 | Kupryjanow | G10L 21/0232 |
| 10,636,434 B1 | * | 4/2020 | Ramprashad | G10L 25/84 |
| 10,686,942 B2 | * | 6/2020 | Mani | H04L 5/16 |

(Continued)

OTHER PUBLICATIONS

Kentaro Koga et al. "Echo Canceller for Multi-Loudspeakers Based on Maximum Likelihood Using an Acoustic Model" Department of Computer Science and Systems Engineering, Kobe University, Japan [retrieved Apr. 30, 2021].

(Continued)

*Primary Examiner* — Lisa Hashem
(74) *Attorney, Agent, or Firm* — Harrington & Smith

(57) ABSTRACT

An AEC system can implement different updating techniques for echo cancellation. A Block Maximum Likelihood updating technique updates filter coefficients typically at integer multiples of a block size. A Proportional-Incremental (Continued)

Maximum Likelihood updating technique applies proportional weighting to the updates of filter coefficients. A Multi-source Incremental Maximum Likelihood updating technique uses separate control parameters associated with each of multiple loudspeakers. Combinations of these may be used, and one or more of these can be selected and implemented in real-time.

20 Claims, 7 Drawing Sheets

(56) References Cited

U.S. PATENT DOCUMENTS

| | | | | |
|---|---|---|---|---|
| 10,811,029 | B1* | 10/2020 | Mansour | G10L 21/0232 |
| 11,046,256 | B2* | 6/2021 | Jain | B60R 11/0247 |
| 11,245,983 | B2* | 2/2022 | Tateishi | H04R 1/021 |
| 11,483,651 | B2* | 10/2022 | Rämö | G10L 21/0208 |
| 11,863,702 | B2* | 1/2024 | Nuzman | H04M 3/002 |
| 12,039,989 | B2* | 7/2024 | Nguyen | H04M 9/082 |
| 2006/0018459 | A1 | 1/2006 | McCree | 379/406.06 |
| 2010/0057454 | A1 | 3/2010 | Mohammad et al. | 704/233 |
| 2019/0149915 | A1* | 5/2019 | Goldstein | H04R 1/1016 381/66 |
| 2023/0199386 | A1* | 6/2023 | Lanneer | G10L 21/0208 381/93 |
| 2023/0245638 | A1* | 8/2023 | Veselinovic | G10K 11/17881 381/66 |
| 2023/0403506 | A1* | 12/2023 | Zhu | H04M 9/08 |
| 2024/0296822 | A1* | 9/2024 | Southwell | G10K 11/17873 |
| 2024/0405799 | A1* | 12/2024 | Pandey | H04B 3/238 |

OTHER PUBLICATIONS

Byung Joon Cho et al. "Stereo Acoustic Echo Cancellation Based on Maximum Likelihood Estimation with Inter-channel-Correlated Echo Compensation" IEEE Transactions on Signal Processing [retrieved Apr. 30, 2021].

Mahfoud Hamidia et al. "Improving Acoustic Echo Cancellation in Hands-free Communication Systems" USTHB, Faculty of Electronics and Computer Science Speech Communication and Signal Processing Laboratory [retrieved Apr. 30, 2021].

Jason Wung "A System Approach to Multi-Channel Acoustic Echo Cancellation and Residual Echo Suppression for Robust Hands-Free Teleconferencing" Georgia Institute of Technology. May 2015.

H. Gnaba-Daasi et al. "A Centralized Acoustic Echo Canceller Based on Perceptual Properties" [retrieved Apr. 30, 2021].

Ochiai et al., "Echo Canceler with Two Echo Path Models", IEEE Transactions on Communications, vol. COM-25, No. 6, Jun. 1977, pp. 589-595.

Benesty, J., Rey, H., Vega, L. R., and Tressens, S. "A nonparametric VSS NLMS algorithm", IEEE Signal Processing Letters, 13(10), 581-584 (2006).

Paleologu, C., Ciochin, S., Benesty J., and Grant, S. L., "An overview on optimized NLMS algorithms for acoustic echo cancellation",EUROSIP Journal on Advances in Signal Processing, 2015:97 (2015).

Albu, F., Paleologu, C., and Benesty, J., "A variable step size evolutionary affine projection algorithm", in 2011 IEEE International Conference on Acoustics, Speech and Signal Processing (ICASSP) (pp. 429-432), IEEE (May 2011).

Duttwiler, Donald L., "Proportionate Normalized Least-Mean-Squares Adaptation in Echo Cancelers", IEEE Transactions On Speech And Audio Processing, vol. 8, No. 5, Sep. 2000, pp. 508-518.

* cited by examiner

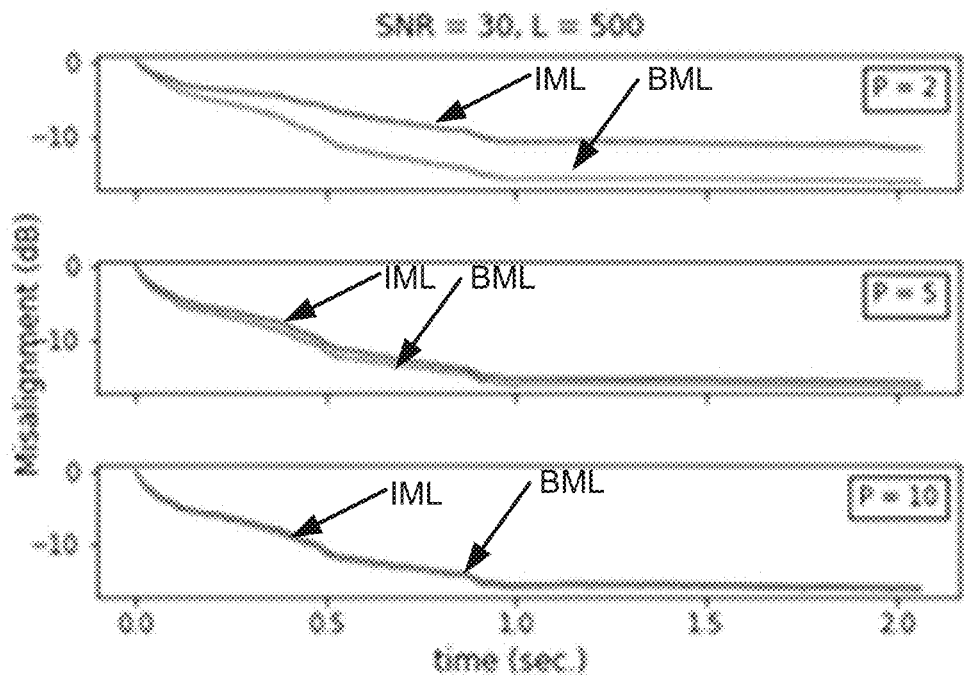
FIG. 4A Input SNR = 30 (dB)
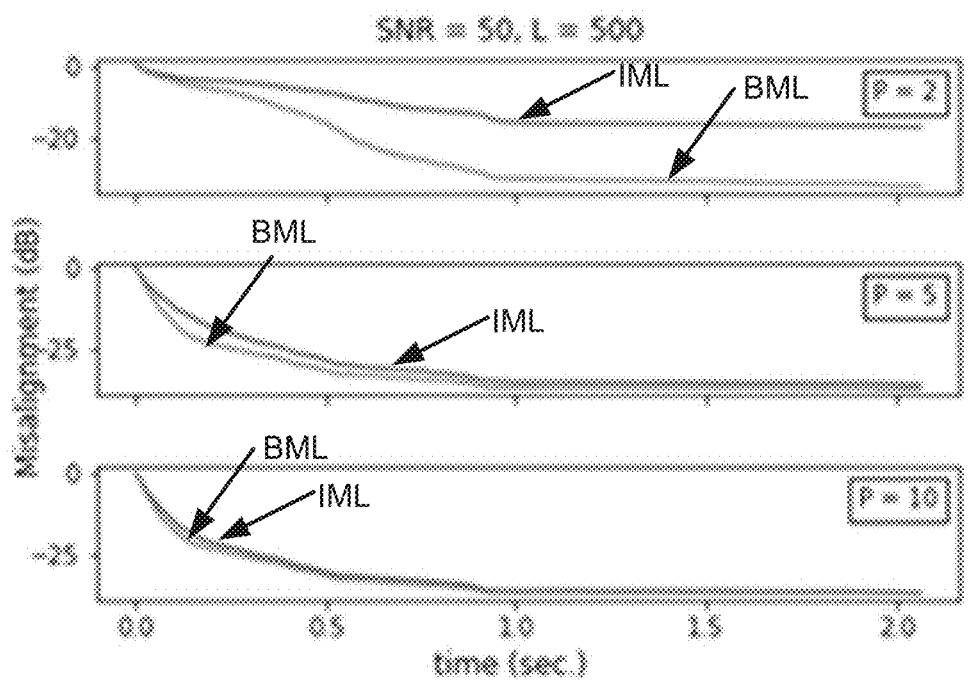
FIG. 4B Input SNR = 50 (dB)

APPARATUS, METHODS AND COMPUTER PROGRAMS FOR PERFORMING ACOUSTIC ECHO CANCELLATION

CROSS-REFERENCE TO RELATED APPLICATIONS

This application is a continuation in part of U.S. patent application Ser. No. 17/393,904, filed on Aug. 4, 2021, which is hereby incorporated by reference in its entirety.

TECHNICAL FIELD

Exemplary embodiments herein relate generally to Acoustic Echo Cancellation (AEC) and, more specifically, relate to processes and apparatus for performing the AEC possibly using Maximum Likelihood (ML) techniques.

BACKGROUND

In a two-way audio system, there is often a "far end" and a "near-end". Consider a person in one room speaking to a colleague in a different location via a video conference. The room is considered to be the "near-end" (relative to the person) and the location with the colleague is considered to be the "far end".

Any two-way audio system in which speakers and microphones are not physically isolated (e.g., speakerphone or conference room) in the near-end requires echo cancellation to prevent the far-end signal produced by the speakers from feeding back to the far end via the microphones. Such systems are in wide use already today, but new use cases involving spatial audio and immersive experience make the technical problem more challenging.

Desirable properties of an audio echo cancellation system include one or more of the following:

1) an ability to track a rapidly changing physical environment even if the far-end signal is strongly correlated;
2) a very low residual echo after convergence;
3) robustness to the presence of intermittent, strong near-end signals; and
4) acceptable complexity (e.g., linear in the length of the cancellation filter).

BRIEF SUMMARY

This section is intended to include examples and is not intended to be limiting.

In an exemplary embodiment, a method is disclosed that includes receiving, at an adaptive echo cancellation system from one or more microphones, an audio signal based on, at least in part, near-end signals and reproduced far-end signals. One or more loudspeakers reproduced the far-end signals, and the audio signal comprises a sequence of samples. The method includes operating the adaptive echo cancellation system, at least in part, with at least one filter so as to update estimates of coefficients of an acoustic channel from the one or more loudspeakers to the one or more microphones. The method includes determining at least one control parameter affecting an operation of the adaptive echo cancellation system that is configurable and is set to at least one value. The determining at least one control parameter is based on estimating an accuracy of the estimates of the coefficients of the acoustic channel, and on updating the coefficients of the at least one filter based on an associated subset of samples from the sequence. The associated subset of samples includes at least two samples not included in any subsets of samples associated with a previous update of the coefficients of the filter. The method includes controlling, by the adaptive echo cancellation system, the at least one filter with different values of the at least one control parameter at different times.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receive, at an adaptive echo cancellation system from one or more microphones, an audio signal based on, at least in part, near-end signals and reproduced far-end signals, wherein one or more loudspeakers reproduced the far-end signals, and the audio signal comprises a sequence of samples; operate the adaptive echo cancellation system, at least in part, with at least one filter so as to update estimates of coefficients of an acoustic channel from the one or more loudspeakers to the one or more microphones; determine at least one control parameter affecting an operation of the adaptive echo cancellation system that is configurable and is set to at least one value, wherein the determining at least one control parameter is based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the filter; and control, by the adaptive echo cancellation system, the at least one filter with different values of the at least one control parameter at different times.

An exemplary computer program product includes a computer-readable storage medium bearing computer program code embodied therein for use with a computer. The computer program code includes: code for receiving, at an adaptive echo cancellation system from one or more microphones, an audio signal based on, at least in part, near-end signals and reproduced far-end signals, wherein one or more loudspeakers reproduced the far-end signals, and the audio signal comprises a sequence of samples; code for operating the adaptive echo cancellation system, at least in part, with at least one filter so as to update estimates of coefficients of an acoustic channel from the one or more loudspeakers to the one or more microphones; code for determining at least one control parameter affecting an operation of the adaptive echo cancellation system that is configurable and is set to at least one value, wherein the determining at least one control parameter is based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the filter; and code for controlling, by the adaptive echo cancellation system, the at least one filter with different values of the at least one control parameter at different times.

In another exemplary embodiment, an apparatus comprises means for performing: receiving, at an adaptive echo cancellation system from one or more microphones, an audio signal based on, at least in part, near-end signals and reproduced far-end signals, wherein one or more loudspeakers reproduced the far-end signals, and the audio signal comprises a sequence of samples; operating the adaptive echo cancellation system, at least in part, with at least one filter so as to update estimates of coefficients of an acoustic channel from the one or more loudspeakers to the one or more microphones; determining at least one control parameter affecting an operation of the adaptive echo cancellation system that is configurable and is set to at least one value, wherein the determining at least one control parameter is based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the filter; and controlling, by the adaptive echo cancellation system, the at least one filter with different values of the at least one control parameter at different times.

In an exemplary embodiment, a method is disclosed that includes receiving, at an adaptive echo cancellation system from one or more microphones, an audio signal based on, at least in part, near-end signals and reproduced far-end signals. One or more loudspeakers reproduced the far-end signals. The method includes operating the adaptive echo cancellation system, at least in part, with at least one filter so as to update estimates of coefficients of an acoustic channel from the one or more loudspeakers to the one or more microphones. The method includes determining at least two control parameters affecting an operation of the adaptive echo cancellation system that are configurable and are set to corresponding at least one values, from a range of values and a characteristic of the near-end signals. The determining the at least two control parameters determines for each of the at least two control parameters an estimated accuracy of the estimates of a different subset of coefficients of the acoustic channel. The method further includes controlling, by the adaptive echo cancellation system, the at least one filter with different values of the at least two control parameters at different times.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer. Another example is the computer program according to this paragraph, wherein the program is directly loadable into an internal memory of the computer.

An exemplary apparatus includes one or more processors and one or more memories including computer program code. The one or more memories and the computer program code are configured to, with the one or more processors, cause the apparatus at least to: receiving, at an adaptive echo cancellation system from one or more microphones, an audio signal based on, at least in part, near-end signals and reproduced far-end signals, wherein one or more loudspeakers reproduced the far-end signals; operating the adaptive echo cancellation system, at least in part, with at least one filter so as to update estimates of coefficients of an acoustic channel from the one or more loudspeakers to the one or more microphones; determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of the estimates of a different subset of coefficients of the acoustic channel; and controlling, by the adaptive echo cancellation system, the at least one filter with different values of the at least two control parameters at different times.

An exemplary computer program product includes a computer-readable storage medium bearing computer program code embodied therein for use with a computer. The computer program code includes: code for receiving, at an adaptive echo cancellation system from one or more microphones, an audio signal based on, at least in part, near-end signals and reproduced far-end signals, wherein one or more loudspeakers reproduced the far-end signals; code for operating the adaptive echo cancellation system, at least in part, with at least one filter so as to update estimates of coefficients of an acoustic channel from the one or more loudspeakers to the one or more microphones; code for determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of the estimates of a different subset of coefficients of the acoustic channel; and code for controlling, by the adaptive echo cancellation system, the at least one filter with different values of the at least two control parameters at different times.

In another exemplary embodiment, an apparatus comprises means for performing: receiving, at an adaptive echo cancellation system from one or more microphones, an audio signal based on, at least in part, near-end signals and reproduced far-end signals, wherein one or more loudspeakers reproduced the far-end signals; operating the adaptive echo cancellation system, at least in part, with at least one filter so as to update estimates of coefficients of an acoustic channel from the one or more loudspeakers to the one or more microphones; determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of the estimates of a different subset of coefficients of the acoustic channel; and controlling, by the adaptive echo cancellation system, the at least one filter with different values of the at least two control parameters at different times.

BRIEF DESCRIPTION OF THE DRAWINGS

In the attached Drawing Figures:

FIGS. 4A and 4B show the progress of the relative misalignment error as a function of time for some example scenarios, wherein FIG. 4A illustrates input SNR that is 30 dB and FIG. 4B illustrates input SNR that is 50 dB;

DETAILED DESCRIPTION OF THE DRAWINGS

Figure 1:
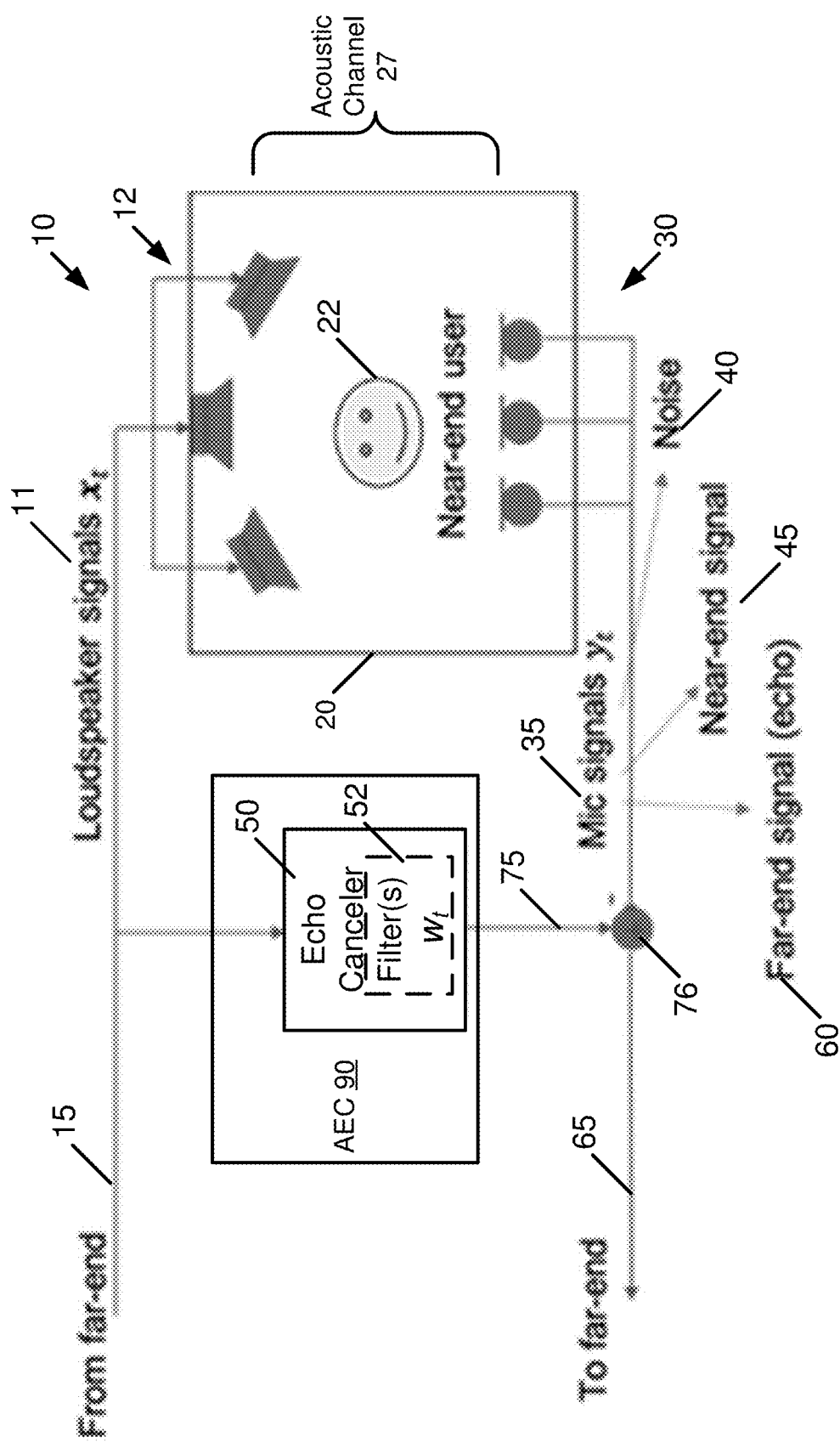
FIG. 1 is a block diagram of an exemplary typical audio system with echo cancellation.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

For the application of systems such as 5G immersive voice, it is desirable to leverage multiple speakers and multiple microphones to provide a more realistic audio experience. For example, comprehension can be enhanced by making different remote voices appear to come from different directions.

Exploiting multiple speakers and microphones in large and dynamic physical environments makes the problem of acoustic echo cancellation more challenging, for several reasons:

1) multiple speakers increase the correlation of the far-end signal, slowing convergence;
2) multiple microphones add to computational complexity;
3) a large physical environment adds to the required length of the cancellation filter; and/or
4) a dynamic physical environment increases the required tracking speed of the system.

To enable immersive voice applications, it would be useful to have an echo cancellation method that can simultaneously and automatically achieve rapid tracking, low residual echo, robustness to near-end signals, and low complexity.

For the generic problem of acoustic echo cancellation, there are numerous algorithms. Three key algorithms for adapting the coefficients of an acoustic echo cancellation filter include Least Mean Square (LMS), Recursive Least Square (RLS), and Affine Projection Algorithm (APA). While all of these can be useful, they have the following limitations, which the techniques presented herein seek to address.

1) LMS has poor convergence especially in the face of correlated far-end signals.
2) RLS has excellent performance but quadratic complexity in the filter length.
3) APA has fast convergence but relatively high residual echo after convergence.

These shortcomings were addressed in U.S. patent application Ser. No. 17/393,904, by inventors Carl Jeremy Nuzman and Shirin Jalali, filed on Aug. 4, 2021, which implements AEC using, e.g., an Incremental Maximum Likelihood (IML) algorithm. This algorithm takes a form similar to an APA, but with e.g., the matrix inverse replaced by a regularized matrix inverse. The IML algorithm may have a parameter, called a control parameter and in exemplary embodiments a confidence parameter, that controls the degree of regularization in the inverse. When the confidence parameter is set (e.g., approximately) equal to the ratio of misalignment to noise, the IML update algorithm achieves low complexity, fast convergence, and low residual echo after convergence as desired.

The Incremental Maximum Likelihood (IML) algorithm is described below. First, a typical audio system is described, then the IML algorithm is described.

Consider the setup shown in FIG. 1. FIG. 1 is a block diagram of an exemplary typical audio system with echo cancellation. There is a signal 15 from the far end and a signal 65 to the far end. The audio system 10 comprises the loudspeaker array 12 (having three speakers in this example), a microphone array 30 (having three microphones in this example), the Acoustic Echo Canceller (AEC) system 90, and an adder 76. The AEC system 90 in this example includes an echo canceler 50 with one or more filters 52 having coefficients $w_t$.

The arrays 12 and 30 may have from one element to many elements, and the numbers of elements of each of the arrays 12, 30 need not be the same. The reference 12 may be used to refer to the loudspeaker array 12, or shortened a single loudspeaker 12 or multiple loudspeakers 12. Similarly, the reference 30 may be used to refer to the microphone array 30 or shortened to a single microphone 30 or multiple microphones 30.

The signal 15 from the far end comprises loudspeaker signals $x_t$ 11, and the microphone (mic) signals $y_t$ 35 comprise noise signals 40, a near-end signal 45, and a received far end signal 60 referred to as echo. In this example, the environment for the system 10 is within a room 20 and the near-end signal 45 is created at least by a near-end audio source, such as a near-end user 22. There is an acoustic channel 27 through which sound from the loudspeakers 12 travels to the microphones 30. It is noted that an acoustic channel is treated herein as a dual concept, encompassing both a physical representation (e.g., the physical channel through which sound travels) and a corresponding mathematic representation (e.g., a matrix of weights describing the physical channel through which sound travels).

The echo canceler 50 and its filter(s) 52, using and applying the coefficients $w_t$, produces an echo estimate 75 that is subtracted by the adder 76 from the microphone signals 35 to create the echo cancelation output $e_t$ 65.

Figure 1A:
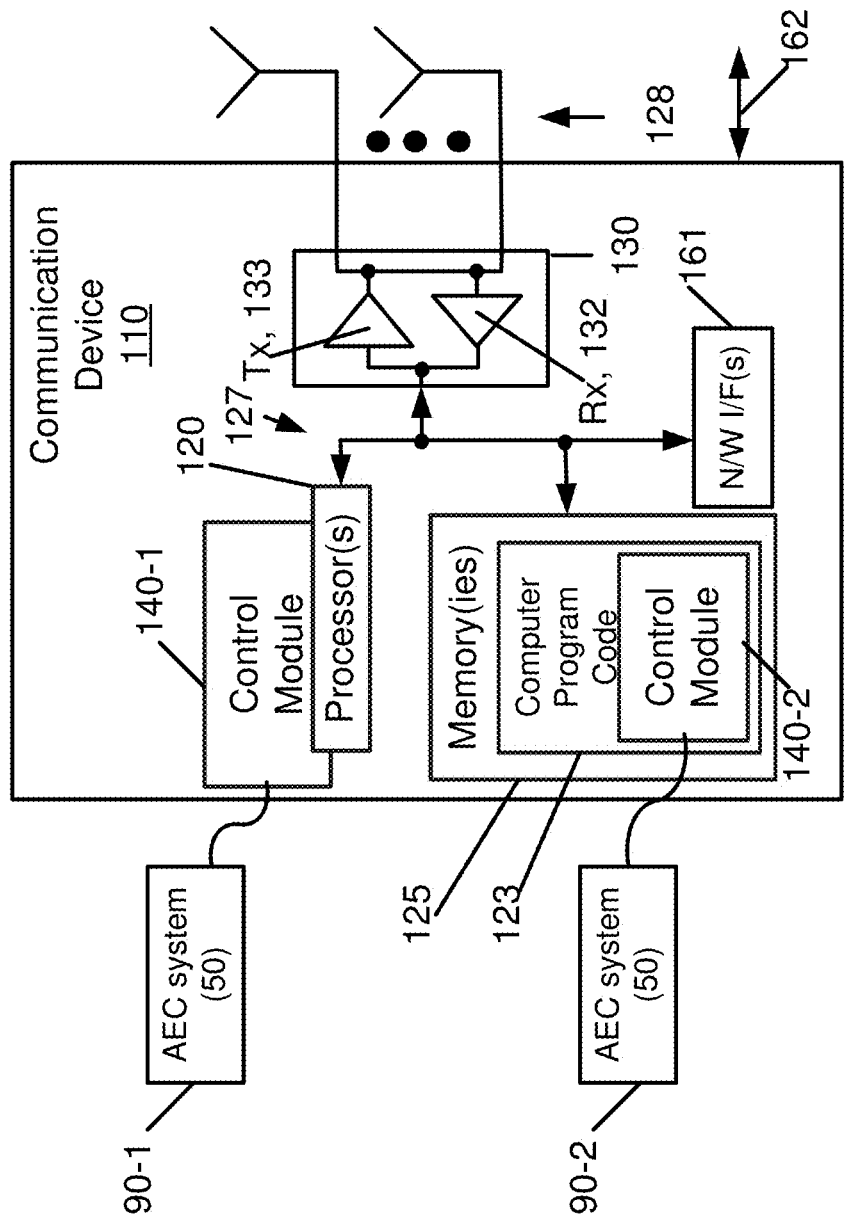
FIG. 1A is a block diagram of a communication device suitable for implementing echo cancellation in accordance with an exemplary embodiment.

FIG. 1A is a block diagram of a communication device 110 suitable for implementing echo cancellation in accordance with an exemplary embodiment. One nonlimiting example of a communication device 110 is a wireless, typically mobile device that can access a wireless network.

The communication device 110 includes one or more processors 120, one or more memories 125, one or more transceivers 130, and one or more network (N/W) interfaces (IF(s)) 161, interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like.

The communication device 110 may be wired, wireless, or both. For wireless communication, the one or more transceivers 130 are connected to one or more antennas 128. The one or more memories 125 include computer program code 123. The N/W I/F(s) communicate via one or more wired links 162.

The communication device 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The AEC system 90 may be similarly implemented as echo canceler module 90-1 as part of control module 140-1, as echo canceler module 59-2 as part of control module 140-2. The AEC system 90 typically includes the echo canceler 50.

The computer readable memories 125 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 125 may be means for performing storage functions. The processors 120 may be of any type suitable to the local technical environment, and may include one or more of general-purpose computers, special purpose computers, microprocessors, digital signal processors (DSPs) and processors based on a multi-core processor architecture, as non-limiting examples. The processors 120 may be means for performing functions, such as controlling the communication device 110, and other functions as described herein.

In general, the various embodiments of the communication device 110 can include, but are not limited to, cellular telephones (such as smart phones, mobile phones, cellular phones, voice over Internet Protocol (IP) (VoIP) phones, and/or wireless local loop phones), tablets, portable computers, room audio equipment, immersive audio equipment, vehicles or vehicle-mounted devices for, e.g., wireless V2X (vehicle-to-everything) communication, image capture devices such as digital cameras, gaming devices, music storage and playback appliances, Internet appliances (including Internet of Things, IoT, devices), IoT devices with sensors and/or actuators for, e.g., automation applications, as well as portable units or terminals that incorporate combinations of such functions, laptops, laptop-embedded equipment (LEE), laptop-mounted equipment (LME), Universal Serial Bus (USB) dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. That is, the communication device 110 could be any device that may be capable of wireless or wired communication.

Now that a typical audio system has been described, further details about the IML algorithm are described. Assume that there is a single loudspeaker (in array 12) and a single microphone (in array 30). The algorithm generalizes to the case of multiple loudspeakers and/or multiple microphones in a straightforward fashion. At time t, the echo canceler 50, with filter length L in its filter(s) 52, receives as input the following:

1) A latest loudspeaker signal vector: $x_t=[x_t, \ldots, x_{t-L+1}]^T \in R^L$, wherein L is the number of coefficients in $w_t$ and R is a set of real vectors of length L.
2) A latest microphone measurement: $y_t \in R$.
3) P−1 previous loudspeaker and microphone measurements: $(x_{t'}, y_{t'})$ for $t'=t-1, \ldots, t-P+1$.
4) A current estimate of echo channel's coefficients $w_t$.

It is now described how the IML updates $w_t$ as a function of its inputs.

Define L×P matrix $X_t=[x_t, \ldots, x_{t-P+1}]$ and P×1 vector $$Y_t = \begin{bmatrix} y_t \\ \vdots \\ y_{t-P+1} \end{bmatrix}.$$

Also, define L×(P−1) matrix $U_{t-1}=[x_{t-1}, \ldots, x_{t-P+1}]$. (Note that $U_{t-1}$ is $X_t$ without the first column.)

Given confidence parameter $c_t$, define a normalization factor parameter as the following:

$$\alpha_t = (\|x_t\|^2 + c_t^{-1} - x_t^T U_{t-1}(c_t^{-1} I_{P-1} + U_{t-1}^T U_{t-1})^{-1} U_{t-1}^T x_t)^{-1}.$$

Then, IML updates the coefficients $w_t$ as the following:

$$w_{t+1} = w_t + \alpha_t(I_L - U_{t-1}(U_{t-1}^T U_{t-1} + c_t^{-1} I_{P-1})^{-1} U_{t-1}^T) x_t (y_t - x_t^T w_t) \quad \text{Eq. 1}$$

With respect to the confidence parameter (CP), the only parameter in the description of IML is the confidence parameter $c_t$. First, it is described how this parameter should be set ideally. Assume that the channel between the loudspeaker and microphone can be described by $w_{OPT} \in R^L$ and therefore, $$y_t = x_t^T w_{OPT} + z_t,$$

where $z_t$ denotes the near end signal, which for example may consist of the sum of a near-end-user voice signal and the additive Gaussian noise. First, consider the case where the near end signal has a steady variance $\sigma_z^2$. This can occur for example when the near-end voice user is silent. In this case, it is ideally desirable to set the parameter $c_t$ as $$c_t = \frac{\|w_t - w_{OPT}\|^2}{L\sigma_z^2}.$$

Setting the parameter as such requires having access to $w_{OPT}$, which is not available. Before a practical method is explained to set parameter $c_t$, two extreme cases are reviewed, which shed light on IML.

The first case relates to the following:

$$\frac{1}{L}\|w_t - w_{OPT}\|^2 \gg \sigma_z^2.$$

In this case, misalignment error $\|w_t - W_{OPT}\|$ dominates additive noise and $c_t$ should be made very large, resulting in $c_t^{-1}$ being set close to zero. This happens at the beginning of a communication session, when the echo canceller does not have a reliable estimate of the coefficients. In the extreme case of $c_t \to \infty$, one can show that IML reduces to standard APA with no regularization. More generally, in this regime $c_t^{-1}$ plays a role analogous to the regularization parameter in regularized APA.

The second case relates to the following:

$$\frac{1}{L}\|w_t - w_{OPT}\|^2 \ll \sigma_z^2.$$

In this case, the system has a high-quality estimate of the echo channel coefficients $w_{OPT}$ and additive noise is dominant. In this case, $c_t$ is set to a small value and IML reduces to LMS with a small step size c.

The two extreme cases show that IML can be explained as a smart adaptive interpolation between APA and LMS, depending on the accuracy of the channel estimate and the level of noise in the measurements.

Concerning setting the confidence parameter, as mentioned earlier, ideally IML sets the parameter $c_t$ based on the power of misalignment at time t. But this is not available in practice. A practical alternative that is inspired by the ideal choice is to set $c_t$ as $$c_t = \frac{\frac{1}{T}\sum_{t'=t-T+1}^{t}(x_{t'}^T w_{t'} - y_{t'})^2}{\sigma_z^2}.$$

This practical choice works well in experiments.

Regarding connection of IML to MLE, to understand IML and its derivation, regularized APA (R-APA) is reviewed. R-APA updates coefficients $w_t$ as follows:

$$w_{t+1} = w_t + X_t(\delta I_P + X_t^T X_t)^{-1}(Y_t - X_t^T w_t).$$

Here, $\delta$ denotes the regularization parameter. Define L×L matrix $P_t$ as $$P_t = I - X_t(I + X_t^T X_t)^{-1} X_t^T.$$

Starting at $w_0 = 0$, at iteration t the following occurs:

$$w_t = w_{OPT} + \Pi_{i=0}^{t-1} P_i w_{OPT} + \Sigma_{i=0}^{t-1} \Pi_{j=i+1}^{t-1} P_j X_i (\delta I_P + X_i^T X_i)^{-1} Z_i,$$

where $Z_t = [z_t, \ldots, z_{t-P+1}]^T$. $P_t$ is a matrix with L–P eigenvalues equal to one and P eigenvalues strictly smaller than one. This characterization shows that the bias in $w_t$, i.e., $\Pi_{i=0}^{t-1} P_i w_{OPT}$, converges to zero at an exponential rate. Therefore, approximately, $w_t$ could be modeled as $N(0_L, M_t)$, where the L×L matrix $M_t$ denotes the covariance matrix of $w_t$. Now assuming that $w_t \sim N(w_o, M_t)$ and $Y_t = X_t^T w_o + Z_t$, the maximum likelihood estimation (MLE) of $w_o$ is as follows:

$$w_{t+1} = w_t + M_t X_t (\sigma_z^2 I_P + X_t^T M_t X_t)^{-1}(Y_t - X_t^T w_t).$$

To simplify this ML-based update rule, assume that $M_t = \sigma_w^2 I_L$. Then, the following occurs:

$$w_{t+1} = w_t + X_t(\delta_{ML} I_P + X_t^T X_t)^{-1}(Y_t - X_t^T w_t),$$

where $$\delta_{ML} = \frac{\sigma_z^2}{\sigma_w^2}.$$

In practice $\sigma_w^2$ can be approximated as $$\frac{1}{L}\|w_{OPT} - w_t\|^2.$$

To further improve this ML-based approach, notice that in this derivation, the past P observations have been treated equally. However, the latest observation ($x_t$, $y_t$) is the new one that is not used in the estimation of $w_t$. Moreover, here, it is simply assumed that $M_t$ is a diagonal matrix. To derive a yet better update rule, it is proposed to use IML, which employs MLE at two steps: first to estimate $M_t$ based on P−1 past observations and, second, to update $w_t$ using the latest observation together with the derived estimate $M_t$.

One embodiment addresses robustness to near-end signal via Voice Activity Detection (VAD). In some voice-oriented applications, the near-end signal $z_t$ can be modelled as the sum $z_t = v_t + u_t$ of a background noise process $v_t$ with variance $\sigma_v^2$ and a strong near-end voice signal $u_t$, where $u_t$ is modeled as a random process that is either on or off. Various voice activity detection methods can be used to detect whether the near-end voice is on or off. In the case of hard VAD, the output of the voice activity detection module can be denoted $a_t = 1$ when voice activity is detected, and $a_t = 0$ when no voice activity is detected, where an "a" is used to indicate activity. With soft VAD, $a_t$ could take on any value between 0 (zero) and 1 (one), to reflect the estimated probability that a voice signal is active.

Figure 2:
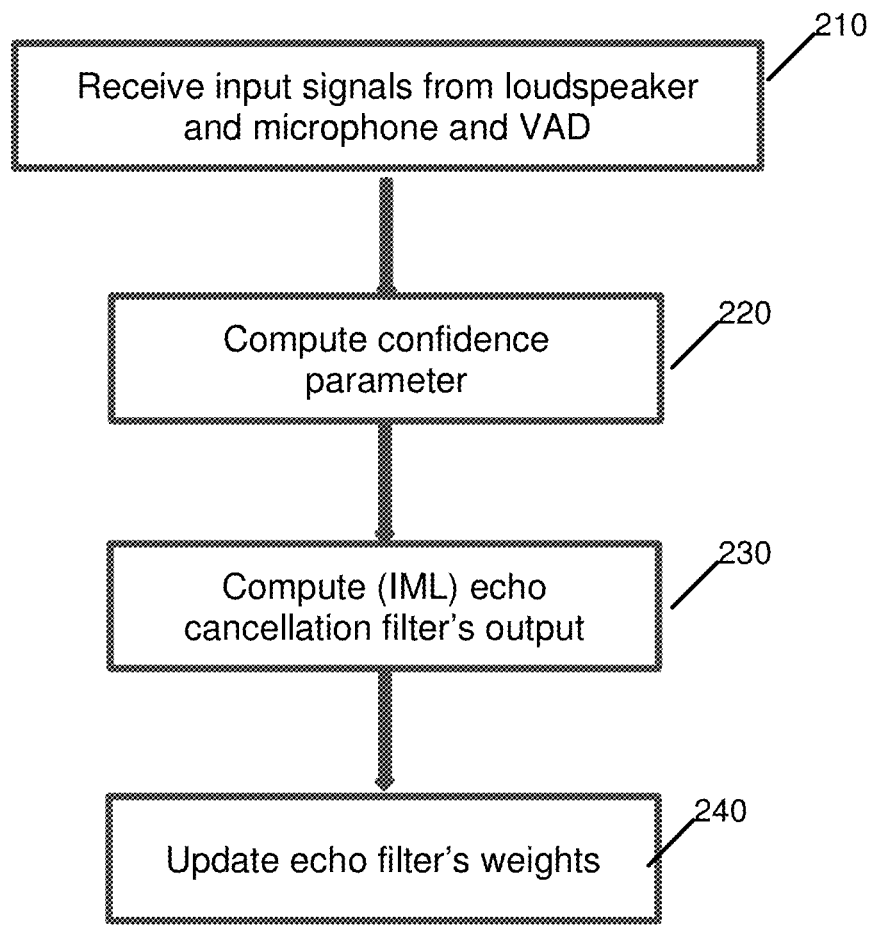
FIG. 2 is a logic flow diagram of a first embodiment.

FIG. 2 is logic flow diagram of a first embodiment. FIG. 2 illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 2 are assumed to be performed by a communication device 110, under control of the AEC system 90 and the control module 140.

In block 210, the communication device 110 receives input signals for the loudspeaker(s) (loudspeaker signal(s) 11 in FIG. 1), the microphone(s) (mic signal(s) 35), and VAD (via the near-end activity detection module 80).

One exemplary embodiment then works at each time step t as follows (see also FIG. 2):

The raw confidence parameter is calculated (block 220) as $$\tilde{c}_t = \frac{\frac{1}{T}\sum_{t'=t-T+1}^{t}(x_{t'}^T w_{t'} - y_{t'})^2}{\sigma_v^2}.$$

The voice activity detection module provides the value $a_t$. The combined confidence parameter is calculated as $c_t = \tilde{c}_t (1 - a_t)$. The updated weight vector $w_{t+1}$ is calculated (block 230) via an IML update step with confidence $c_t$. One example uses the convention that an update with $c_t=0$ is interpreted as the limit of the IML update equation as $c_t \to 0$, namely an LMS update with step size zero: $w_{t+1}=w_t$. This may be performed by the adaptive weight update function 70 of FIG. 1, which may also perform the updating of the echo filter's weights in block 240. This updating modifies the response of the echo canceler 50 via the filter(s) 52 accordingly.

What was described above was certain of the IML examples in U.S. patent application Ser. No. 17/393,904. While these examples are useful, they could be improved sometimes.

In more detail, due to the challenging nature of the 5G immersive voice echo cancellation problem, there is pressure from an engineering point of view to push the complexity of the solution as low as possible, while making the convergence speed as high as possible. Novel variations of the IML concept may be needed to achieve the best possible tradeoff in various use cases.

To address these and other issues, and as an overview, the exemplary embodiments relate to hands-free communication in mobile devices where one (or more) loudspeakers are provided in order to convey far-end sound to the near-end user, and one (or more) microphones are provided to capture near-end sound to be conveyed to the far-end user. An echo cancellation module is provided to reduce the extent to which the far-end sound propagates back to the far-end user via the chain of loudspeakers, local acoustic channel, and microphone. An adaptive mechanism for the echo cancellation module is provided that uses, e.g., a window of P past samples to update the filter coefficients in the echo cancellation module.

The exemplary embodiments include several embodiments, each with its own technical advantages.

One exemplary embodiment is a Block Maximum Likelihood (BML) update. This is an algorithm which has lower computational complexity than IML, but also in some cases, slower convergence speed. The conventional IML algorithm determines the (e.g., optimal) filter at each time t based on the filter at time t−1 and measurements from time t−1 to t−P, for some specified memory length P. In contrast, the BML algorithm only updates the filter at times of the form t=kB, that is, for times that are integer multiples of an integer block size B, B≤P. The update is still based on measurements from time t−1 to t−P. The lowest complexity, for given P, is achieved by taking a block size equal to memory size, B=P. In scenarios with strongly correlated loudspeaker signals, the BML algorithm with large P can obtain much lower computational complexity than IML while only being slightly slower in convergence.

Another exemplary embodiment is a Proportional-Incremental Maximum Likelihood (P-IML) update. Many acoustic echo impulse responses are sparse, meaning that the majority of impulse response coefficients are close to zero. There is a conventional algorithm referred to as P-NLMS (proportionate normalized least mean square) that is similar to NLMS but obtains faster convergence than NLMS when the channel impulse response is sparse. This method was described in Dutweiler, "Proportionate normalized least-mean-square adaptation in echo cancellers", IEEE Trans. Sig Proc, 2000. The core of the method in Dutweiler is to update different filter coefficients with a weight that is proportional to their magnitude. Expanding upon this by including such proportional weights into the IML update formula yields a method that has the same beneficial properties as IML, but converges even faster than IML when the echo impulse response is sparse. As is often done in the art, it can be said that an acoustic channel is sparse if the impulse response associated with that channel is sparse as defined in this paragraph.

A further exemplary embodiment is a Multi-source Incremental Maximum Likelihood (MS-IML) update. In applications with two or more loudspeakers, the original IML algorithm described in U.S. patent application Ser. No. 17/393,904 may converge slowly if the strength of the loudspeaker signals, received at the microphone, are very different from each other. This can arise for example if the microphone is physically closer to one speaker, or if the transmitted signals themselves are not of equal power. The original IML algorithm may be further improved by a modified version of the algorithm that has a separate control parameter associated with each loudspeaker; the control parameter may be set to the residual echo-to-noise ratio associated with each loudspeaker. This modified version, referred to as the MS-IML algorithm, achieves fast convergence even in the case of multiple loudspeakers with heterogeneous received power levels. MS-IML can likewise be useful if the echo cancellation is based on filtering multiple transformed loudspeaker signals obtained by applying a linear transformation to the multiple transmitted signals, where the transformed signals have unequal power, even if the transmitted signals themselves have more or less equal power. For example, left and right stereo signals $x_L(t)$ and $x_R(t)$ are sometimes represented as sum and difference signals $x_S(t)=x_L(t)+x_R(t)$ and $x_D(t)=x_L(t)-x_R(t)$, respectively. In some stereo echo cancellation systems, the canceller may include two adaptive filters that use $x_S(t)$ and $x_D(t)$ as respective inputs, rather than including two adaptive filters that use $x_L(t)$ and $x_R(t)$ as respective inputs. It can commonly happen that the power of $x_D(t)$ is smaller than that of $x_S(t)$. In this case, MS-IML can achieve faster convergence than IML, due to power differences between $x_D(t)$ and $x_S(t)$, even when the transmitted signals $x_S(t)$ and $x_R(t)$ themselves have the same power.

It is also possible to unify all of these under a single embodiment. This is described via an XML embodiment, and is described below.

These exemplary embodiments are now described in further detail.

Before proceeding with additional details, certain of the concepts presented below are characterized in mathematical form. The following table is a reference guide to the parameters and their corresponding exemplary meanings.

| Parameter | Meaning |
| --- | --- |
| $x_t$ | latest loudspeaker signal vector |
| $y_t$ | latest microphone measurement |
| L | filter length and channel impulse response length |
| P − 1 | number of previous loudspeaker and microphone measurements used in the coefficient update algorithm |

-continued

| Parameter | Meaning |
| --- | --- |
| $w_t$ | current estimate of echo channel's coefficients (also referred to as a weight vector) |
| $w_{t-1}$ | a previous estimate of the echo-channel's coefficients |
| $c_t$ | confidence parameter |
| $w_{OPT}$ | the (unknown) channel impulse response of length L |
| $z_t$ | near-end signal, e.g., the voice signal of the near-end user |
| $v_t$ | background noise in near-end signal |
| f | function for the echo canceler that defines new echo channel coefficients $w_t$ |
| B | block size |
| $e_t$ | echo canceller output signal |
| $x_t^T w_{OPT}$ | effect of far end signal as received at the microphone |
| $\sigma_z^2$ | near-end signal power |
| $\sigma_v^2$ | background noise contribution to near-end signal power |
| $m_{t-P} = \|w_{t-P} - w_{OPT}\|^2/L$ | misalignment |

This table is provided for ease of reference, and is not meant to be exhaustive or limiting. Also, these parameters may be referred to using other names at times.

As before, assume that there is a single loudspeaker (in array 12) and a single microphone (in array 30). The algorithm generalizes to the case of multiple loudspeakers and/or multiple microphones in a straightforward fashion. At time t, the echo canceler 50, with filter length L in the filter(s) 52, receives as input the following:

1) A latest loudspeaker signal vector: $x_t = [x_t, \ldots x_{t-L+1}]^T \in R^{n_w}$, wherein $n_w$ is the number of coefficients in $w_t$ and R is a set of real vectors of length $n_w$.

2) A latest microphone measurement: $y_t \in R$.

The microphone measurement is typically modeled as $y_t = w_{OPT}^T x_t + z_t$ where $w_{OPT}$ is the (unknown) channel impulse response of length L and $z_t$ is the (unknown) near-end signal. The echo canceller 50 is characterized by filter coefficients $w_t$ of length L in the filter(s) 52, and generates an output signal $e_t = y_t - w_t^T x_t$. The goal is to remove the received loudspeaker signal $w_{OPT}^T x_t$ from $y_t$ to obtain a clean output $e_t \approx z_t$. Depending on context, we sometimes refer to $z_t$ as noise, and sometimes refer to it as the near-end signal.

The optimal filter coefficients are unknown, and an adaptive algorithm is used to find filter coefficients as close to optimal as possible.

The echo canceller 50 has saved, from a previous iteration, P–1 previous loudspeaker and microphone measurements: $(x_{t'}, y_{t'})$ for $t'=t-2, \ldots, t-P$, and a previous estimate of the echo-channel's coefficients $w_{t-1}$.

The adaptive echo canceller is defined by a function $f$ that defines new echo channel coefficients as the following:

$$w_t = f(w_{t-1}, \{y_s\}_{s=t-1}^{t-P}, \{x_s\}_{s=t-1}^{t-P}; c_t),$$

where $c_t$ is a control parameter.

Notation is introduced for the history of length P at time t:

$$X_{t,P} = [x_t x_{t-1} \ldots x_{t-P+1}], \text{ and}$$

$$y_{t,P} = [y_t y_{t-1} \ldots y_{t-P+1}]^T.$$

In this notation, the IML update formula (Eq. 1 above) can be described via the following equations:

$$V_{t,1} = X_{t,1} - X_{t-1,P-1}(X_{t-1,P-1}^T X_{t-1,P-1} + c_{t-P}^{-1} I)^{-1} X_{t-1,P-1}^T X_{t,1}, \text{ and}$$

$$w_{IML}^P(t) = w_{IML}^P(t-1) + V_{t,1}(X_{t,1}^T V_{t,1} + c_{t-P}^{-1} I)^{-1} (y_{t,1} - X_{t,1}^T w_{IML}^P(t-1)). \quad \text{Eq. 2}$$

As these equations show, the new filter coefficients $w_{IML}^P(t)$ are obtained as a function of the previous estimate $w_{IML}^P(t-1)$, the most recent microphone sample $y_{t,1}$, the last P loudspeaker vectors $X_{t,P} = [X_{t,1} \, X_{t-1,P-1}]$, and the confidence parameter $c_{t-P}$. For best performance, the confidence parameter should be set to an estimate of the ideal value $$c_{t-P}^* = \frac{\|w_{t-P} - w_{OPT}\|^2}{L\sigma_z^2},$$

where $\sigma_z^2$ is the near-end signal power and $m_{t-P} = \|w_{t-P} - w_{OPT}\|^2/L$ is referred to as the misalignment. The value $c_t^*$ is unknown in practice, but can be estimated by methods described above.

Exemplary various embodiments are now described.

Figure 3:
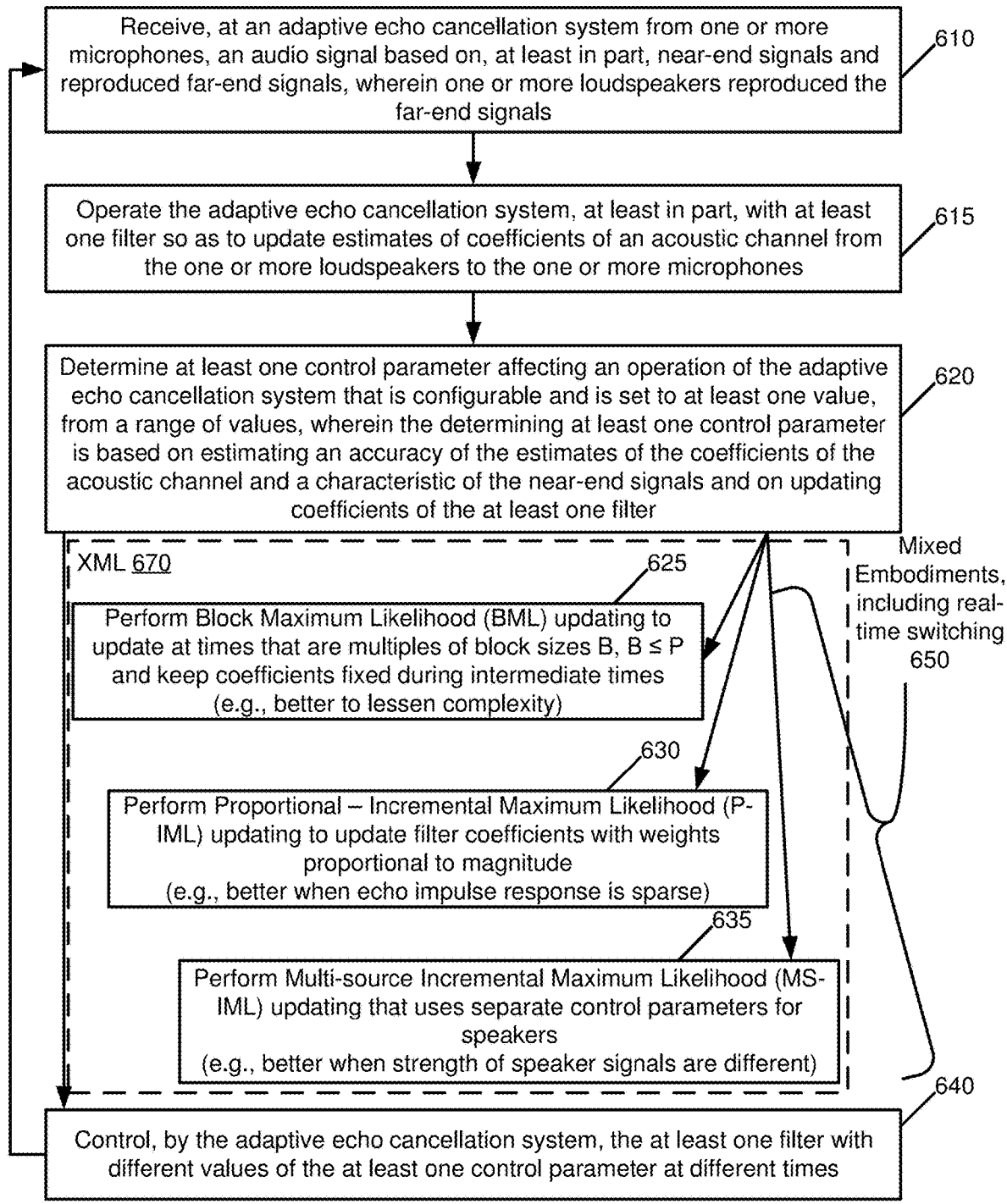
FIG. 3, which is a logic flow diagram for acoustic echo cancellation using a control parameter and different maximum likelihood schemes.

These exemplary embodiments are described with reference, in part, to FIG. 3, which is a logic flow diagram for acoustic echo cancellation using a control parameter and different maximum likelihood schemes. FIG. 3 also illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 3 are assumed to be performed by apparatus 10, e.g., under control of the control module 140 and its corresponding AEC system 90.

In block 610, the AEC system 90 receives, from one or more microphones 30, an audio signal 30 based on, at least in part, near-end signals 40 and reproduced far-end signals 60, wherein one or more loudspeakers 12 reproduced the far-end signals 15. The AEC system 90 in block 615, is operated, at least in part, with at least one filter (e.g., filter(s) 52) so as to update estimates of coefficients (e.g., $w_t$) of an acoustic channel from the one or more loudspeakers 12 to the one or more microphones 30.

The AEC system 90 determines in block 620 at least one control parameter affecting an operation of the AEC system 90 that is configurable and is set to at least one value, from a range of values. The determining at least one control parameter is based on estimating an accuracy of the estimates of the coefficients of the acoustic channel and a characteristic of the near-end signals and on updating coefficients of the at least one filter. There are three major schemes for this: Block Maximum Likelihood (BML) update in block 625, which modifies timing of updates relative to the timing used in IML; a Proportional-Incremental Maximum Likelihood (P-IML) update in block 635, which modifies weighting used for the coefficients relative to weighting used in IML; and a Multi-source Incremental Maximum Likelihood (MS-IML) update in block 635, which uses separate control parameters for speakers instead of a single control parameter as used in IML.

Concerning Block Maximum Likelihood (BML) in block 625, for a given block size $1 < B \leq P$, the block maximum likelihood update is defined as the following:

$$V_{nB,B} = X_{nB,B} - X_{nB-B,P-B}(X_{nB-B,P-B}^T X_{nB-B,P-B} + c_{nB-P}^{-1}I)^{-1} X_{nB-B,P-B}^T X_{nB,B}, \text{ and}$$

$$w_{BML}^{B,P}(nB) = w_{BML}^{B,P}(nB-B) + V_{nB,B}(X_{nB,B}^T V_{nB,B} + c_{nB-P}^{-1}I)^{-1}(y_{nB,B} - X_{nB,B} w_{BML}^{B,P}(nB-B)). \quad \text{Eq. 3}$$

In this approach, the filter is updated only at times t=nB that are integer multiples of the block size. The filter coefficients are kept fixed during intermediate times, i.e., we maintain $w_{BML}^{B,P}(nB+i) = w_{BML}^{B,P}(nB)$ for $i=0, \ldots, B-1$.

The technical strength of this algorithm is that it has reduced computational complexity compared with IML, assuming the same history parameter P. Larger P values are helpful when the loudspeaker signals are strongly correlated in time. In terms of dominant terms, the IML algorithm requires about $LP^2 + C(P-1)^3$ operations per time sample, where C is some constant associated with matrix inversion. The BML algorithm, with B=P, requires about $L(P+1)^2 + CP^3$ operations per P time samples, or $L(P+1)^2/P + CP^2$ operations per time sample. Thus, BML can be significantly less complex for large P. In some implementations, the implementation complexity will be a non-trivial function of the parameters that depends on the particular hardware and software choices.

Other values of the block size B can have other technical advantages. For example, since the method requires one matrix inversion of size P-B and one of size B, the maximum matrix inverse size is minimized for a given value of P by using B=P/2, which can be useful for implementation. For example, since matrix inverses of size 2 have a simple closed form, the case B=2, P=4, is especially easy to implement.

Regarding Proportional Incremental Maximum Likelihood (P-IML) in block 630, in some applications, it is known or expected from physical principles that the true channel impulse response w* is sparse, i.e., that a large fraction of elements is equal to zero, or close enough to zero to have only a negligible effect on the received signal. A technical advantage is expected mainly when the fraction of near zero values is more than 50 percent of the total values.

There is an algorithm referred to as P-NLMS (proportionate normalized least mean square) that is similar to NLMS but obtains faster convergence when the channel impulse response is sparse. This method was described in (Dutweiler, Proportionate normalized least-mean-square adaptation in echo cancellers, IEEE Trans. Sig Proc, 2000). The essence of the method is that, after partial convergence, the estimates of zero or near-zero coefficients will be small and the estimates of large coefficients will be large. By making the step-size proportional to the magnitude of the current estimate, convergence of the non-zero coefficients is accelerated.

In the NLMS context, the method was essentially to define a diagonal L×L weight matrix G(t) with tr(G)=L, defined by $$G_{t,kk} = \frac{L(|w_k(t)| + \Delta)}{L\Delta + \sum |w_n(t)|},$$

where $\Delta > 0$ is a small regularization parameter. (There are additional details in the definition omitted here.) The P-NLMS update is defined as the following:

$$w(t) = w(t-1) + \mu \frac{G_{t-1} x_t}{x_t^T x_t}(y_t - x_t^T w(t-1)).$$

To similarly enhance convergence for the IML algorithm, the IML formula is modified by replacing the vector $X_{t,1}$ with the proportionally weighted vector $G_{t-1} X_{t,1}$.

This yields the P-IML algorithm as follows:

$$G_{t-1,kk} = \frac{L(|w_k(t)| + \Delta)}{L\Delta + \sum |w_n(t)|},$$

$$V_{t,1} = G_{t-1} X_{t,1} - G_{t-1} X_{t-1,P-1}(X_{t-1,P-1}^T G_{t-1} X_{t-1,P-1} + c_{t-P}^{-1}I)^{-1} X_{t-1,P-1}^T G_{t-1} X_{t,1},$$

$$w_{PIML}^P(t) = w_{PIML}^P(t-1) + V_{t,1}(X_{t,1}^T V_{t,1} + c_{t-P}^{-1}I)^{-1}(y_{t,1} - X_{t,1}^T w_{PIML}^P(t-1)).$$

This method has the technical advantage that it converges faster than IML when the channel is sparse. It also generally converges faster than P-NLMS, for the same reasons that IML converges faster than NLMS.

Concerning Multi-Source Incremental Maximum Likelihood (MS-IML) in block 635, to describe this embodiment, a model is introduced with two loudspeaker signals $x_t^{(1)}$ and $x_t^{(2)}$ being picked up by a single microphone after passing through channels 27 with respective impulse responses $w_{OPT}^{(1)}$ and $w_{OPT}^{(2)}$. The microphone signal is then the following:

$$y_t = x_t^{(1)T} w_{OPT}^{(1)} + x_t^{(2)T} w_{OPT}^{(2)} + z_t,$$

as one might obtain in the case of stereo loudspeakers being picked up by a single microphone. Here $x_t^{(k)} = [x_t^{(k)}, \ldots, x_{t-L+1}^{(k)}]^T$ is the snapshot of the k-th loudspeaker signal.

Formally we can concatenate the two channels with the notation $x_t = [x_t^{(1)T} \ x_t^{(2)T}]^T$ and $w_{OPT} = [w_{OPT}^{(1)T} \ w_{OPT}^{(2)T}]^T$, and obtain a model in the original form $y_t = x_t^T w_{OPT} + z_t$.

An adaptive algorithm for the full system could be obtained by applying the IML (or BML, and the like) to this concatenated system. However, this does not work very well in general because the overall ideal control parameter $$c_{t-P}^* = \frac{\|w_{t-P} - w_{OPT}\|^2}{(2L)\sigma_z^2},$$

can be very different from the ideal control parameters of each individual sub-filter, that is $$c_{t-P}^{(k)*} = \frac{\|w_{t-P}^{(k)} - w_{OPT}^{(k)}\|^2}{L\sigma_z^2}.$$

For example, if the loudspeaker signal $x_t^{(1)}$ is much stronger than the loudspeaker signal $x_t^{(2)}$, then after some adaptation, the error in filter $w_t^{(1)}$ will be much smaller than the error in filter $w_t^{(2)}$, ideal confidence parameter $c_{t-P}^{(1)*}$ will be much smaller than $c_{t-P}^{(2)*}$, and the average parameter $c_{t-P}^*$ will not be optimal for the further convergence of either filter.

To overcome this problem, two separate control parameters $c_{t-P}^{(1)}$ and $c_{t-P}^{(2)}$ used that are estimates of respective ideal parameters $c_{t-P}^{(1)*}$ and $c_{t-P}^{(2)*}$, and define $c_{t-P} = \frac{1}{2}(c_{t-P}^{(1)} + c_{t-P}^{(2)})$ A diagonal weight matrix is defined as follows:

$$R_t = \begin{bmatrix} \frac{c_{t-P}^{(1)}}{c_{t-P}} I & 0 \\ 0 & \frac{c_{t-P}^{(2)}}{c_{t-P}} I \end{bmatrix},$$

and the IML update formula is updated by replacing $X_{t,1}$ with the weighted version $R_t X_{t,1}$. The multi-source incremental update algorithm is then as follows:

$$V_{t,1} = R_t X_{t,1} - R_t X_{t-1,P-1}(X_{t-1,P-1}^T R_t X_{t-1,P-1} + c_{t-P}^{-1}I)^{-1} x_{t-1,P-1}^T R_t X_{t,1},$$

and $$w_{MS-IML}^P(t) = w_{MS-IML}^P(t-1) + V_{t,1}(X_{t,1}^T V_{t,1} + c_{t-P}^{-1}I)^{-1} (y_{t,1} - X_{t,1}^T w_{MS-IML}^P(t-1)).$$

In this reweighted version, fast convergence is achieved similar to the single source case.

These techniques generalize naturally to the case of N parallel channels, by taking the weighting matrix $$R_t = \begin{bmatrix} \frac{c_{t-P}^{(1)}}{c_{t-P}} I & \cdots & 0 \\ \vdots & \ddots & \vdots \\ 0 & \cdots & \frac{c_{t-P}^{(N)}}{c_{t-P}} I \end{bmatrix},$$

based on individual confidence parameters for each filter, together with the average confidence parameter $$c_t = \frac{1}{N}\left(\sum_{k=1}^N c_t^{(k)}\right).$$

In block 640, the AEC system 90 controls the at least one filter 52 with different values of the at least one control parameter at different times. This may entail performing the process again by restarting at block 610.

Mixed embodiments 650 are now described. That is, it is possible to combine embodiments in various ways. For example, the proportional weight matrix $G_t$ used for P-IML could be incorporated into the BML or MS-IML to make proportional versions of these algorithms that converge faster on sparse channels. Likewise, in a multi-source scenario, one could incorporate the $R_t$ weighting matrix into the BML update equations to get a multi-source algorithm that updates on a block basis, with reduced complexity compared with MS-IML.

Furthermore, it is possible to switch in mixed embodiments 650 between some of these in real time. For instance, the AEC system 50 may start with normal IML, then switch to the BML based on a certain criterion, e.g., related to processing speed for the algorithm. For example, if the processing time (or power consumption) for the IML becomes what is deemed to be too long or take up too much of the overall processing capability (or power consumption), as determined by threshold(s), the system could switch to BML. The AEC system 50 could also start with IML then determine the acoustic echo impulse response is sparse, and switch to P-IML. The AEC system 50 could start with IML, determine power differences between speakers are "high" (e.g., above some threshold), and switch to MS-IML. All combinations of BML, P-IML, and MS-IML are possible.

Another example is to use IML when a new communication session is initializing or when a change in the acoustic environment is detected (since this is when convergence speed is most critical) and use BML otherwise (to save computational resources or power consumption).

In general, BML might be used if one wants to reduce complexity, P-IML if one has reason to believe the channel is sparse, MS-IML if there are multiple loudspeakers. Any combination of the above may be used if any combination of the reasons is present.

It is noted that, for MS-IML, advantages come into play when there are power differences between loudspeakers. Since in general one wants the system to work no matter what signals come over the loudspeakers, it would be useful to use MS-IML whenever multiple speakers are present so that the system is robust to power differences.

With respect to block 670, referred to under the heading of XML, it is possible to unify all of these under a single embodiment. Before proceeding with a description of unification, it is helpful to discuss how the P-IML and MS-IML may be considered to be related.

For P-IML and MS-IML, one common element is that the updates of different filter coefficients are weighted differently.

In the case of P-IML, the diagonal matrix $G_{t-1}$ appears on the left side of the definition of $V_{t,1}$, and hence effects differently the size of the update to different elements of $w_{PIML}^P(t-1)$.

In the case of MS-IML, the diagonal matrix $R_t$ appears on the left side of the definition of $V_{t,1}$, and hence effects differently the size of the update to different elements of $w_{MS-IML}^P(t-1)$.

In both cases, one can further say that the weights are not all identical to each other (otherwise the weights get back to IML) and that they somehow are proportional to an estimate of the error in the corresponding coefficients.

For MS-IML, this is clear; for the case of two loudspeakers, in the expression $$R_t = \begin{bmatrix} \frac{c_{t-P}^{(1)}}{c_{t-P}} I & 0 \\ 0 & \frac{c_{t-P}^{(2)}}{c_{t-P}} I \end{bmatrix},$$

the weights in the top and bottom half of $R_t$ are related to different estimates of the error for the two filters, as represented by $c_{t-P}^{(1)}$ and $c_{t-P}^{(2)}$.

For P-IML, the weights in $G_{t-1}$ are proportional to the size of the coefficients $w_{t-1}$. In the case of a sparse channel, $|w_{t-1,k}|$ is being used as a rough estimate of the error in $w_{t-1,k}$, via the logic that for small coefficients, the true value is probably close to 0, and so the error is probably $|w_{t-1,k}|$. So then for the small coefficients, $G_{t-1}$ is proportional to an estimate of the error.

It can be seen that P-IML and MS-IML may be considered to be related. This also has effects for the single embodiment described below.

The single embodiment that covers the BML 625, P-IML 630 and MS-IML 635 is described now via an XML 650 embodiment.

A general formula applicable to all embodiments, which is referred to as XML is as follows. Compare with Eq. 2 and in particular Eq. 3 above.

$$V_{nB,B} = R_{nB} X_{nB,B} - R_{nB} X_{nB-B,P-B} (X_{nB-B,P-B}^T R_{nB} X_{nB-B,P-B} + c_{nB-P}^{-1} I)^{-1} X_{nB-B,P-B}^T R_{nB} X_{nB,B},$$

and $$w_{BML}^{B,P}(nB) = w_{BML}^{B,P}(nB-B) + V_{nB,B}(X_{nB,B}^T V_{nB,B} + c_{nB-P}^{-1} I)^{-1}(y_{nB,B} - X_{nB,B} w_{BML}^{B,P}(nB-B)).$$

This is different from the BML formula (Eq. 3) only in that there is a matrix $R_{nB}$ added in four places to the formula for $V_{nB,B}$. Eight cases can be enumerated, as indicated by the following table.

| B > 1 | R depends on current filter coefficient size | R depends on which source the filter coefficient is associated with | Name | Properties |
|---|---|---|---|---|
| 0 | 0 | 0 | IML | algorithm described in U.S. Patent Application Ser. No. 17/393,904, by inventors Carl Jeremy Nuzman and Shirin Jalali, filed on Aug. 4, 2021 |
| 1 | 0 | 0 | BML | lower complexity |
| 0 | 1 | 0 | P-IML | converges faster for sparse channel |
| 0 | 0 | 1 | MS-IML | converges faster for multiple sources |
| 1 | 1 | 0 | P-BML | lower complexity and converges faster for sparse channels |
| 1 | 0 | 1 | MS-BML | lower complexity and converges faster for multiple sources |
| 0 | 1 | 1 | MS-P-IML | converges fastest for sparse channel and multiple sources |
| 1 | 1 | 1 | MS-P-BML | lower complexity and converges fastest for sparse channel and multiple sources |

There are also disadvantages associated with each feature, which is why any embodiment may be preferred over any other, depending on the application. Consider the following:

BML: can converge a little slower than without BML;

P-IML: if the channel is not sparse, can converge slower than without P-IML; and MS-IML: is only applicable if there are multiple sources, and has additional complexity in estimating filter uncertainty separately for each source.

For the first column of the chart: if this column is 0, then B=1, otherwise if this column is 1, then B>1. This is a matter of updating the filter coefficients at every time sample, or blockwise, but may involve performing the updates correctly for near-optimal performance.

The second and third columns determine the definition of the matrix $R_{nB}$.

As noted, the second and third column are two variations of an idea, which is to make the weight of adaptation depend on an estimate of uncertainty in the filter coefficient. So those two columns can be united (as further described above with respect to the relationship between P-IML and MS-IML).

The four possible combinations of the second and third columns are given below.

00: $R_{nB} = I$. Identity matrix, no special weighting.

10: $R_{nB} = G(nB)$. A diagonal matrix $G(nB)$, whose entries are basically proportional to the magnitude of the current filter coefficients $w_{XML}^{B,P}(nB-B)$. This is similar to the previously-described diagonal L×L weight matrix $G(t)$ with $tr(G) = L$, defined by $$G_{t,kk} = \frac{L(|w_k(t)| + \Delta)}{L\Delta + \sum |w_n(t)|},$$

where $\Delta > 0$ is a small regularization parameter.

01

$$R_{nB} = \begin{bmatrix} \frac{c_{nB-P}^{(1)}}{c_{nB-P}} I & 0 \\ 0 & \frac{c_{nB-P}^{(2)}}{c_{nB-P}} I \end{bmatrix},$$

which is a diagonal matrix with a submatrix for each source, where each submatrix is scaled by a factor $$\frac{c_{nB-P}^{(i)}}{c_{nB-P}}$$

capturing information about the estimated error in filter coefficients associated with that source.

$$R_{nB} = \begin{bmatrix} \frac{c_{nB-P}^{(1)}}{c_{nB-P}} G(nB)^{(1)} & 0 \\ 0 & \frac{c_{nB-P}^{(2)}}{c_{nB-P}} G(nB)^{(2)} \end{bmatrix},$$

which is a diagonal matrix with a submatrix for each source, where each submatrix is scaled by a factor $$\frac{c_{nB-P}^{(i)}}{c_{nB-P}}$$

capturing information about the estimated error in filter coefficients associated with that source, and also by a diagonal matrix $G(nB)^{(i)}$, whose entries are essentially proportional to the magnitude of the current filter coefficients associated with that source.

Performance results are now described. Described are the results of various experiments that show the benefits of the various embodiments.

First, consider a comparison of BML and IML. FIGS. 4A and 4B show the progress of the relative misalignment error $m_t/m_0 = \|w_t - w_{OPT}\|^2 / \|w_{OPT}\|^2$ as a function of time for some example scenarios. FIG. 4A illustrates input SNR that is 30 dB and FIG. 4B illustrates input SNR that is 50 dB. An adaptive filter of length L=500 is being used to remove echo from a simulated microphone signal, resulting from passing a recorded audio loudspeaker signal through a channel with impulse response length of 500 samples, and adding white noise. The ratio of loudspeaker signal to additive noise is 30 dB in FIG. 4A and 50 dB in FIG. 4B Memory levels of P=2, 5, and 10 are used. The performance of IML is plotted and marked, and the performance of Block ML method using block size B=P is also plotted and marked. One can see that convergence speed improves with larger memory length P, as discussed in U.S. patent application Ser. No. 17/393,904. It is also seen that the convergence speed of BML is slower than that of IML. However, for large values of P, BML is nearly as good as IML, while having significantly lower computational complexity. Thus, BML can be advantageous in this regime.

Figure 5:
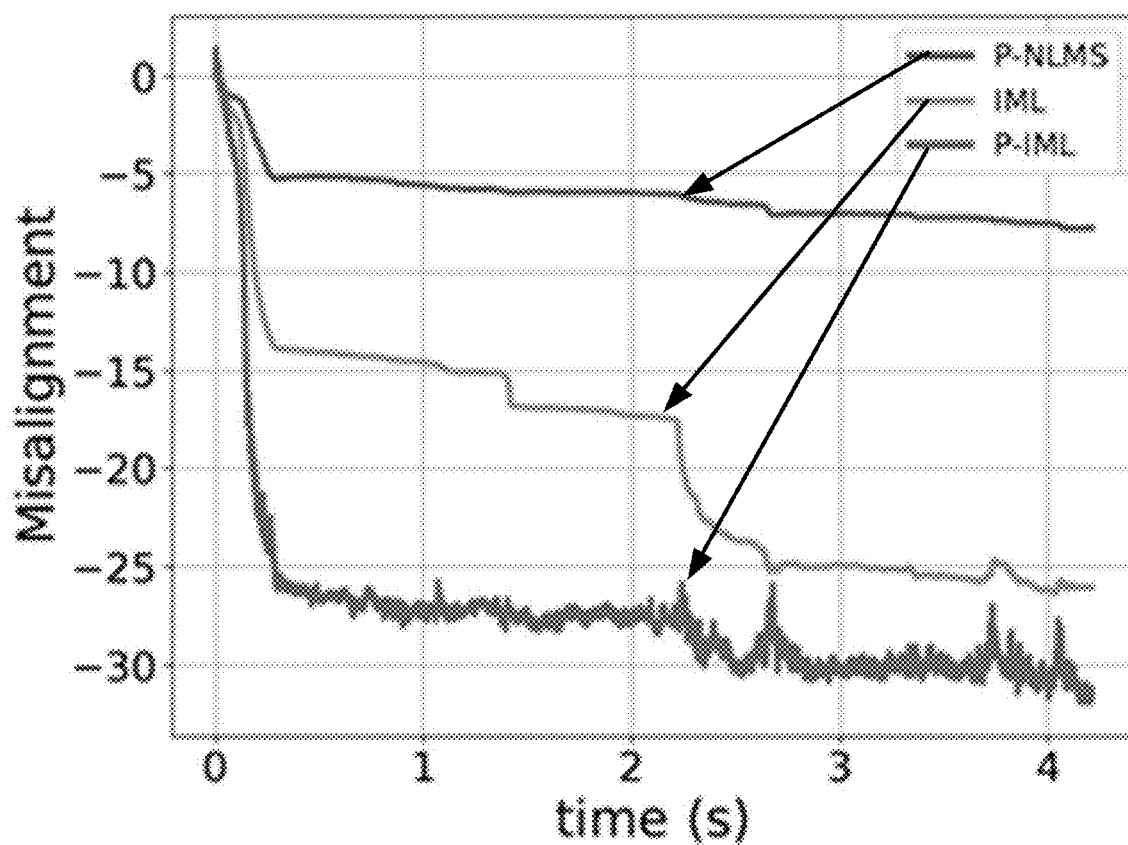
FIG. 5 shows relative misalignment as a function of time for P-NLMS, IML, and P-IML algorithms.

Consider next a comparison of IML and P-IML: FIG. 5 shows relative misalignment as a function of time for three adaptive algorithms, for a scenario that is qualitatively similar to the scenario shown in FIG. 5. In this scenario however, the channel impulse response is sparse, in the sense that only 10% of the L impulse response taps are non-zero. The blue curve shows the performance of the P-NLMS algorithm of (Dutweiler 2000), previously mentioned, with a fixed step size. The performance of the IML algorithm of U.S. patent application Ser. No. 17/393,904 was generated with P=8. The performance of the P-IML algorithm, an embodiment herein, was also generated with P=8. Because P-NLMS takes advantage of sparsity, it converges faster than NLMS (not shown). But IML converges still faster because it is able to work more effectively with the strongly correlated input signal, and also because it continuously adapts the control parameter. The proportional version of IML, an embodiment herein, has even better performance because it is able to exploit the sparsity of the channel while still retaining the advantages of IML.

Figures 6, 6A, 6B:
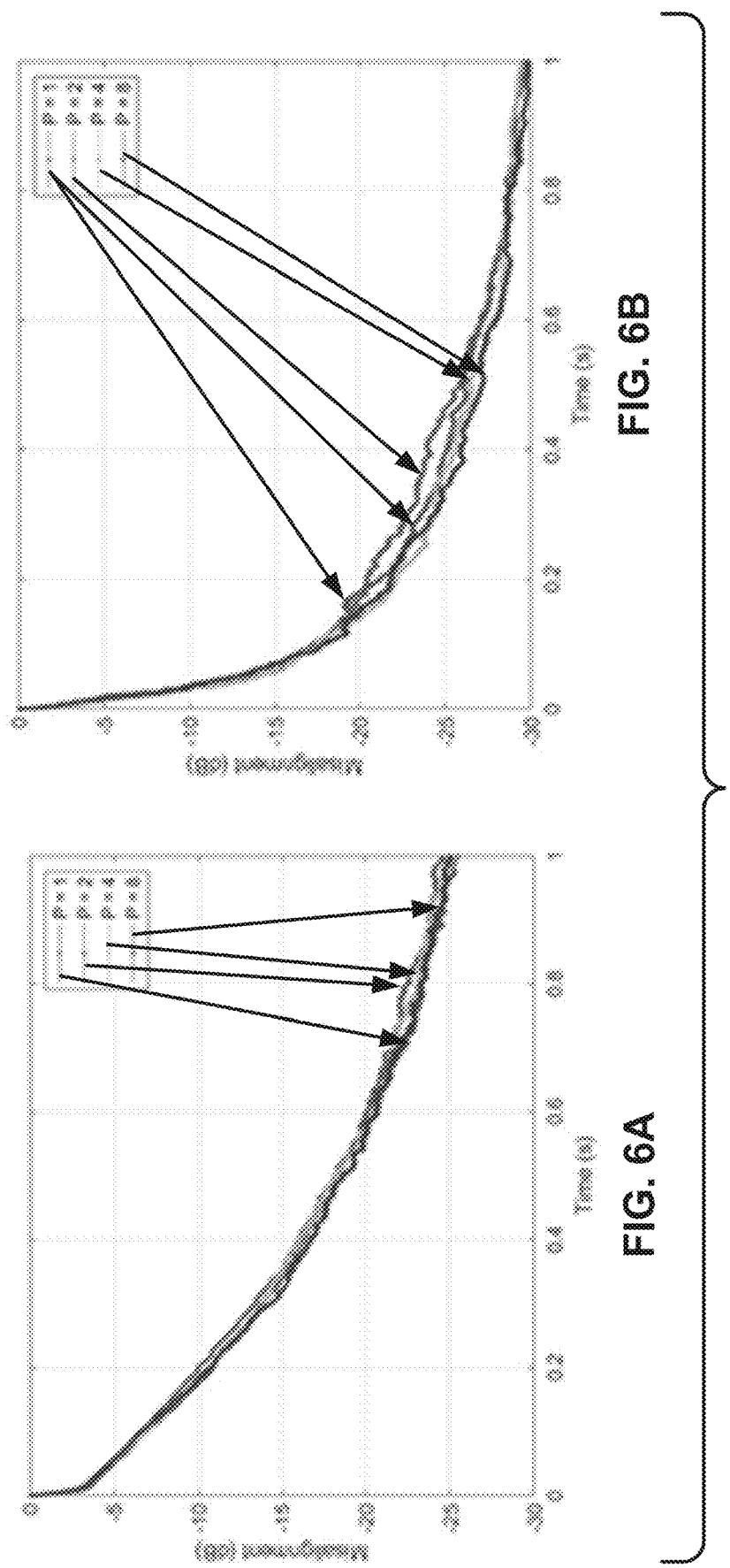
FIG. 6, split into
FIGS. 6A and 6B, illustrate relative misalignment as a function of time in an echo cancellation system with two loudspeakers and one microphone, and with unequal loudspeaker signal powers, where FIG. 6A uses IML, and FIG. 6B uses MS-IML.

A third comparison is between IML and MS-IML. To illustrate the technical advantages of ML-IML in multi-loudspeaker situations, an experiment with two loudspeaker signals and one microphone is described. The channel impulse responses from each loudspeaker to the microphone are of similar strength, but the transmitted signal strength from the second loudspeaker is $\frac{1}{10}$ the power of the first loudspeaker. The loudspeaker signals are both white noise, independent of each other. FIG. 6, split into FIGS. 6A and 6B, illustrate relative misalignment as a function of time in a echo cancellation system with two loudspeakers and one microphone, and with unequal loudspeaker signal powers, where FIG. 6A uses IML, and FIG. 6B uses MS-IML; FIG. 6(a) shows the progress of relative misalignment when using IML to adapt the filter coefficients, with memory values P={1,2,4,8}. Convergence is initially rapid, until about −4 dB, after which the convergence slows considerably. Root cause analysis shows that the cause is effectively that the control parameter tuned to the overall misalignment is too high for one filter and too low for the other filter.

FIG. 6B shows the progress of the relative misalignment when using MS-IML, with a separate control parameter for each filter. In this case, the convergence is rapid and in-line with performance seen in single-source scenarios. For example, with IML it takes about 0.6 seconds to reach −20 dB relative misalignment, while with MS-IML, this level is reached in less than 0.2 seconds.

The following are additional examples.

A method for echo cancellation of a two-way audio communication, comprising:
  receiving, at an adaptive echo cancellation system from one or more microphones, an audio signal based on, at least in part, near-end signals and reproduced far-end signals, wherein one or more loudspeakers reproduced the far-end signals;
  operating the adaptive echo cancellation system, at least in part, with at least one filter so as to update estimates of coefficients of an acoustic channel from the one or more loudspeakers to the one or more microphones;
  determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of the estimates of a different subset of coefficients of the acoustic channel, wherein the at least two control parameters comprise a control parameter that affects a rate of change of corresponding estimates of coefficients of the acoustic channel and comprise a control parameter based on updating different filter coefficients with corresponding weights proportional to their magnitudes; and
  controlling, by the adaptive echo cancellation system, the at least one filter with different values of the at least two control parameters at different times.

An apparatus for echo cancellation of a two-way audio communication, comprising means for performing:
  receiving, at an adaptive echo cancellation system from one or more microphones, an audio signal based on, at least in part, near-end signals and reproduced far-end signals, wherein one or more loudspeakers reproduced the far-end signals;
  operating the adaptive echo cancellation system, at least in part, with at least one filter so as to update estimates of coefficients of an acoustic channel from the one or more loudspeakers to the one or more microphones;
  determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of the estimates of a different subset of coefficients of the acoustic channel, wherein the at least two control parameters comprise a control parameter that affects a rate of change of corresponding estimates of coefficients of the acoustic channel and comprise a control parameter based on updating different filter coefficients with corresponding weights proportional to their magnitudes; and controlling, by the adaptive echo cancellation system, the at least one filter with different values of the at least two control parameters at different times.

A method for echo cancellation of a two-way audio communication, comprising:

receiving, at an adaptive echo cancellation system from one or more microphones, an audio signal based on, at least in part, near-end signals and reproduced far-end signals, wherein multiple loudspeakers reproduced the far-end signals;

operating the adaptive echo cancellation system, at least in part, with at least one filter so as to update estimates of coefficients of an acoustic channel from the one or more loudspeakers to the one or more microphones, wherein the acoustic channel comprises multiple acoustic subchannels, each associated with a different one of the multiple loudspeakers;

determining at least two control parameters affecting an operation of the adaptive echo cancellation system that are configurable and are set to corresponding at least one values, from a range of values and a characteristic of the near-end signals, wherein each of the at least two control parameters corresponds to one of the multiple acoustic subchannels, wherein the determining the at least two control parameters determines for each of the at least two control parameters an estimated accuracy of the estimates of a subset of coefficients associated with the acoustic subchannel corresponding to that control parameter; and controlling, by the adaptive echo cancellation system, the at least one filter with different values of the at least two control parameters at different times.

An apparatus for echo cancellation of a two-way audio communication, comprising means for performing:

receiving, at an adaptive echo cancellation system from one or more microphones, an audio signal based on, at least in part, near-end signals and reproduced far-end signals, wherein multiple loudspeakers reproduced the far-end signals;

operating the adaptive echo cancellation system, at least in part, with at least one filter so as to update estimates of coefficients of an acoustic channel from the one or more loudspeakers to the one or more microphones, wherein the acoustic channel comprises multiple acoustic subchannels, each associated with a different one of the multiple loudspeakers;

determining at least two control parameters affecting an operation of the adaptive echo cancellation system that are configurable and are set to corresponding at least one values, from a range of values and a characteristic of the near-end signals, wherein each of the at least two control parameters corresponds to one of the multiple acoustic subchannels, wherein the determining the at least two control parameters for each of the at least two control parameters an estimated accuracy of the estimates of a subset of coefficients associated with the acoustic subchannel corresponding to that control parameter; and controlling, by the adaptive echo cancellation system, the at least one filter with different values of the at least two control parameters at different times.

Example 1. A method for echo cancellation of a two-way audio communication, comprising:

receiving, at an adaptive echo cancellation system from one or more microphones, an audio signal based on, at least in part, near-end signals and reproduced far-end signals, wherein one or more loudspeakers reproduced the far-end signals, and the audio signal comprises a sequence of samples;

operating the adaptive echo cancellation system, at least in part, with at least one filter so as to update estimates of coefficients of an acoustic channel from the one or more loudspeakers to the one or more microphones;

determining at least one control parameter affecting an operation of the adaptive echo cancellation system that is configurable and is set to at least one value, wherein the determining at least one control parameter is based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the filter; and controlling, by the adaptive echo cancellation system, the at least one filter with different values of the at least one control parameter at different times.

Example 2. The method according to example 1, wherein the associated subset of samples is a block of samples and subsets of samples in previous updates are corresponding blocks of samples, the blocks having at least two samples and less than a number of samples in the sequence of samples.

Example 3. The method according to example 2, wherein updates are performed every block of samples of the audio signal.

Example 4. The method according to one of examples 2 or 3, wherein the blocks have a same number of samples, updating the coefficients of the at least one filter occurs at multiples of the number of samples in the block, and the coefficients of the at least one filter are kept fixed during times between when blocks are used for the updating.

Example 5. The method according to any one of examples 1 to 4, wherein:

the determining and controlling are for a first procedure;

a second procedure has at least two control parameters comprising a control parameter that affects a rate of change of corresponding estimates of coefficients of the acoustic channel and comprising a control parameter based on updating different filter coefficients with corresponding weights proportional to their magnitude and the controlling, by the adaptive echo cancellation system, the at least one filter with different values of the at least one control parameter at different times controls the at least one filter with different values of the at least two control parameters at different times; and the method comprises choosing, based on one or more criteria, whether to use the first procedure or second procedure for a time period.

Example 6. The method according to example 5, wherein:
for the first and second procedures, multiple loudspeakers reproduced the far-end signals, the acoustic channel comprises multiple subchannels, each associated with a different one of the multiple loudspeakers;
the at least one control parameters comprise at least two control parameters, each of the at least two control parameters corresponding to one of the multiple subchannels; and
the controlling, by the adaptive echo cancellation system, the at least one filter with different values of the at least one control parameter at different times controls the at least one filter with different values of the at least two control parameters at different times.

Example 7. The method according to example 1, wherein:
multiple loudspeakers reproduced the far-end signals, the acoustic channel comprises multiple subchannels, each associated with a different one of the multiple loudspeakers;
the at least one control parameters comprise at least two control parameters, each of the at least two control parameters corresponding to one of the multiple subchannels; and
the controlling, by the adaptive echo cancellation system, the at least one filter with different values of the at least one control parameter at different times controls the at least one filter with different values of the at least two control parameters at different times.

Example 8. A method for echo cancellation of a two-way audio communication, comprising:
receiving, at an adaptive echo cancellation system from one or more microphones, an audio signal based on, at least in part, near-end signals and reproduced far-end signals, wherein one or more loudspeakers reproduced the far-end signals;
operating the adaptive echo cancellation system, at least in part, with at least one filter so as to update estimates of coefficients of an acoustic channel from the one or more loudspeakers to the one or more microphones;
determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of the estimates of a different subset of coefficients of the acoustic channel; and
controlling, by the adaptive echo cancellation system, the at least one filter with different values of the at least two control parameters at different times.

Example 9. The method according to example 8, wherein the at least two control parameters comprise a control parameter that affects a rate of change of corresponding estimates of coefficients of the acoustic channel and comprise a control parameter based on updating different filter coefficients with corresponding weights proportional to their magnitudes.

Example 10. The method according to example 9, wherein the estimated accuracy of the estimates for the control parameter based on updating different filter coefficients with corresponding weights proportional to their magnitudes comprises an estimate of the accuracy of a coefficient where a small coefficient is considered to be accurate while a large coefficient is considered not to be as accurate.

Example 11. The method according to example 10, wherein the method for echo cancellation is applied to a sparse acoustic channel.

Example 12. The method according to any one of examples 8 to 11, wherein multiple loudspeakers reproduced the far-end signals, and wherein the acoustic channel comprises multiple subchannels, each associated with a different one of the multiple loudspeakers, and each of the at least two control parameters corresponds to one of the multiple subchannels.

Example 13. The method according to any one of examples 8 to 12, wherein:
the determining and controlling are for a first procedure;
the audio signal comprises a sequence of samples;
a second procedure determines the at least one control parameter based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and
the method comprises choosing, based on one or more criteria, whether to use the first procedure or the second procedure for a time period.

Example 14. The method according to example 9, wherein:
the determining and controlling are for a first procedure;
the audio signal comprises a sequence of samples;
a second procedure determines the at least one control parameter based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and
the method comprises choosing, based on one or more criteria, whether to use the first procedure or the second procedure for a time period.

Example 15. The method according to example 12, wherein:
the determining and controlling are for a first procedure;
the audio signal comprises a sequence of samples;
a second procedure determines the at least one control parameter based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and
the method comprises choosing, based on one or more criteria, whether to use the first procedure or the second procedure for a time period.

Example 16. An apparatus for echo cancellation of a two-way audio communication, comprising means for performing:
receiving, at an adaptive echo cancellation system from one or more microphones, an audio signal based on, at least in part, near-end signals and reproduced far-end signals, wherein one or more loudspeakers reproduced the far-end signals, and the audio signal comprises a sequence of samples;

operating the adaptive echo cancellation system, at least in part, with at least one filter so as to update estimates of coefficients of an acoustic channel from the one or more loudspeakers to the one or more microphones;

determining at least one control parameter affecting an operation of the adaptive echo cancellation system that is configurable and is set to at least one value, wherein the determining at least one control parameter is based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the filter; and controlling, by the adaptive echo cancellation system, the at least one filter with different values of the at least one control parameter at different times.

Example 17. The apparatus according to example 16, wherein the associated subset of samples is a block of samples and subsets of samples in previous updates are corresponding blocks of samples, the blocks having at least two samples and less than a number of samples in the sequence of samples.

Example 18. The apparatus according to example 17, wherein updates are performed every block of samples of the audio signal.

Example 19. The apparatus according to one of examples 17 or 18, wherein the blocks have a same number of samples, updating the coefficients of the at least one filter occurs at multiples of the number of samples in the block, and the coefficients of the at least one filter are kept fixed during times between when blocks are used for the updating.

Example 20. The apparatus according to any one of examples 16 to 19, wherein:

the determining and controlling are for a first procedure;

a second procedure has at least two control parameters comprising a control parameter that affects a rate of change of corresponding estimates of coefficients of the acoustic channel and comprising a control parameter based on updating different filter coefficients with corresponding weights proportional to their magnitude and the controlling, by the adaptive echo cancellation system, the at least one filter with different values of the at least one control parameter at different times controls the at least one filter with different values of the at least two control parameters at different times; and the means are further configured for performing choosing, based on one or more criteria, whether to use the first procedure or second procedure for a time period.

Example 21. The apparatus according to example 20, wherein:

for the first and second procedures, multiple loudspeakers reproduced the far-end signals, the acoustic channel comprises multiple subchannels, each associated with a different one of the multiple loudspeakers;

the at least one control parameters comprise at least two control parameters, each of the at least two control parameters corresponding to one of the multiple subchannels; and the controlling, by the adaptive echo cancellation system, the at least one filter with different values of the at least one control parameter at different times controls the at least one filter with different values of the at least two control parameters at different times.

Example 22. The apparatus according to example 16, wherein:

multiple loudspeakers reproduced the far-end signals, the acoustic channel comprises multiple subchannels, each associated with a different one of the multiple loudspeakers;

the at least one control parameters comprise at least two control parameters, each of the at least two control parameters corresponding to one of the multiple subchannels; and the controlling, by the adaptive echo cancellation system, the at least one filter with different values of the at least one control parameter at different times controls the at least one filter with different values of the at least two control parameters at different times.

Example 23. An apparatus for echo cancellation of a two-way audio communication, comprising means for performing:

receiving, at an adaptive echo cancellation system from one or more microphones, an audio signal based on, at least in part, near-end signals and reproduced far-end signals, wherein one or more loudspeakers reproduced the far-end signals;

operating the adaptive echo cancellation system, at least in part, with at least one filter so as to update estimates of coefficients of an acoustic channel from the one or more loudspeakers to the one or more microphones;

determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of the estimates of a different subset of coefficients of the acoustic channel; and controlling, by the adaptive echo cancellation system, the at least one filter with different values of the at least two control parameters at different times.

Example 24. The apparatus according to example 23, wherein the at least two control parameters comprise a control parameter that affects a rate of change of corresponding estimates of coefficients of the acoustic channel and comprise a control parameter based on updating different filter coefficients with corresponding weights proportional to their magnitudes.

Example 25. The apparatus according to example 24, wherein the estimated accuracy of the estimates for the control parameter based on updating different filter coefficients with corresponding weights proportional to their magnitudes comprises an estimate of the accuracy of a coefficient where a small coefficient is considered to be accurate while a large coefficient is considered not to be as accurate.

Example 26. The apparatus according to example 25, wherein the acoustic channel is sparse.

Example 27. The apparatus according to any one of examples 23 to 26, wherein multiple loudspeakers reproduced the far-end signals, and wherein the acoustic channel comprises multiple subchannels, each associated with a different one of the multiple loudspeakers, and each of the at least two control parameters corresponds to one of the multiple subchannels.

Example 28. The apparatus according to any one of examples 23 to 27, wherein:
the determining and controlling are for a first procedure;
the audio signal comprises a sequence of samples;
a second procedure determines the at least one control parameter based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and
the means are further configured for performing choosing, based on one or more criteria, whether to use the first procedure or the second procedure for a time period.

Example 29. The apparatus according to example 24, wherein:
the determining and controlling are for a first procedure;
the audio signal comprises a sequence of samples;
a second procedure determines the at least one control parameter based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and
the means are further configured for performing choosing, based on one or more criteria, whether to use the first procedure or the second procedure for a time period.

Example 30. The apparatus according to example 27, wherein:
the determining and controlling are for a first procedure;
the audio signal comprises a sequence of samples;
a second procedure determines the at least one control parameter based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and
the means are further configured for performing choosing, based on one or more criteria, whether to use the first procedure or the second procedure for a time period.

Example 31. The apparatus according to any of examples 16 to 30, wherein the means comprises:
at least one processor; and
at least one memory including computer program code, the at least one
memory and computer program code configured to, with the at least one processor,
cause the performance of the apparatus.

Example 32. A computer program, comprising code for performing the methods of any of examples 1 to 15, when the computer program is run on a computer.

Example 33. The computer program according to example 32, wherein the computer program is a computer program product comprising a computer-readable medium bearing computer program code embodied therein for use with the computer.

Example 34. The computer program according to example 32, wherein the computer program is directly loadable into an internal memory of the computer.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1A. A computer-readable medium may comprise a computer-readable storage medium (e.g., memories 125 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

5G fifth generation
AEC Acoustic Echo Cancellation or Acoustic Echo Canceller
APA Affine Projection Algorithm
BML Block Maximum Likelihood
CP Confidence Parameter
IML Incremental Maximum Likelihood
LMS Least Mean Square
Mic microphone
ML Maximum Likelihood
MLE Maximum Likelihood Estimation
MS-BML Multi-Source Block Maximum Likelihood
MS-IML Multi-Source Incremental Maximum Likelihood
MS-P-BML Multi-Source Proportional-Block Maximum Likelihood
MS-P-IML Multi-Source Proportional-Incremental Maximum Likelihood
NLMS Normalized Least Mean Square
P-IML Proportional-Incremental Maximum Likelihood
P-NLMS proportionate normalized least mean square
R-APA Regularized Affine Projection Algorithm
RLS Recursive Least Square
s seconds
SNR signal to noise ratio
XML A general ML formula encompassing BML, P-IML, and MS-IML

What is claimed is:

1. A method for echo cancellation of a two-way audio communication, comprising:
    receiving, at an adaptive echo cancellation system from one or more microphones, an audio signal based on, at least in part, near-end signals and reproduced far-end signals, wherein one or more loudspeakers reproduced the far-end signals, and the audio signal comprises a sequence of samples;
    operating the adaptive echo cancellation system, at least in part, with at least one filter so as to update estimates of coefficients of an acoustic channel from the one or more loudspeakers to the one or more microphones;
    determining at least one control parameter affecting an operation of the adaptive echo cancellation system that is configurable and is set to at least one value, wherein the determining at least one control parameter is based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the filter; and
    controlling, by the adaptive echo cancellation system, the at least one filter with different values of the at least one control parameter at different times.

2. A method for echo cancellation of a two-way audio communication, comprising:
    receiving, at an adaptive echo cancellation system from one or more microphones, an audio signal based on, at least in part, near-end signals and reproduced far-end signals, wherein one or more loudspeakers reproduced the far-end signals;
    operating the adaptive echo cancellation system, at least in part, with at least one filter so as to update estimates of coefficients of an acoustic channel from the one or more loudspeakers to the one or more microphones;
    determining at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of estimates of a different subset of coefficients of the acoustic channel; and
    controlling, by the adaptive echo cancellation system, the at least one filter with different values of the at least two control parameters at different times.

3. The method according to claim 2, wherein the at least two control parameters comprise a control parameter that affects a rate of change of corresponding estimates of coefficients of the acoustic channel and comprise a control parameter based on updating different filter coefficients with corresponding weights proportional to magnitudes of the different filter coefficients.

4. The method according to claim 2, wherein multiple loudspeakers reproduced the far-end signals, and wherein the acoustic channel comprises multiple subchannels, each associated with a different one of the multiple loudspeakers, and each of the at least two control parameters corresponds to one of the multiple subchannels.

5. An apparatus for echo cancellation of a two-way audio communication, comprising:
    one or more processors; and
    one or more memories storing instructions that, when executed by the one or more processors, cause the apparatus to perform at least the following:
    receive, at an adaptive echo cancellation system from one or more microphones, an audio signal based on, at least in part, near-end signals and reproduced far-end signals, wherein one or more loudspeakers reproduced the far-end signals, and the audio signal comprises a sequence of samples;
    operate the adaptive echo cancellation system, at least in part, with at least one filter so as to update estimates of coefficients of an acoustic channel from the one or more loudspeakers to the one or more microphones;
    determine at least one control parameter affecting an operation of the adaptive echo cancellation system that is configurable and is set to at least one value, wherein the determining at least one control parameter is based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the filter; and
    control, by the adaptive echo cancellation system, the at least one filter with different values of the at least one control parameter at different times.

6. The apparatus according to claim 5, wherein the associated subset of samples is a block of samples and subsets of samples in previous updates are corresponding blocks of samples, the blocks having at least two samples and less than a number of samples in the sequence of samples.

7. The apparatus according to claim 6, wherein updates are performed every block of samples of the audio signal.

8. The apparatus according to claim 7, wherein the blocks have a same number of samples, updating the coefficients of the at least one filter occurs at multiples of the number of samples in the block, and the coefficients of the at least one filter are kept fixed during times between when blocks are used for the updating.

9. The apparatus according to claim 5, wherein:
the determining and controlling are for a first procedure;
a second procedure has at least two control parameters comprising a control parameter that affects a rate of change of corresponding estimates of coefficients of the acoustic channel and comprising a control parameter based on updating different filter coefficients with corresponding weights proportional to magnitudes of the different filter coefficients and the controlling, by the adaptive echo cancellation system, the at least one filter with different values of the at least one control parameter at different times controls the at least one filter with different values of the at least two control parameters at different times; and
the one or more memories further store instructions that, when executed by the one or more processors, cause the apparatus to choose, based on one or more criteria, whether to use the first procedure or second procedure for a time period.

10. The apparatus according to claim 9, wherein:
for the first and second procedures, multiple loudspeakers reproduced the far-end signals, the acoustic channel comprises multiple subchannels, each associated with a different one of the multiple loudspeakers;
the at least one control parameter comprise at least two control parameters, each of the at least two control parameters corresponding to one of the multiple subchannels; and
the controlling, by the adaptive echo cancellation system, the at least one filter with different values of the at least one control parameter at different times controls the at least one filter with different values of the at least two control parameters at different times.

11. The apparatus according to claim 5, wherein:
multiple loudspeakers reproduced the far-end signals, the acoustic channel comprises multiple subchannels, each associated with a different one of the multiple loudspeakers;
the at least one control parameter comprise at least two control parameters, each of the at least two control parameters corresponding to one of the multiple subchannels; and
the controlling, by the adaptive echo cancellation system, the at least one filter with different values of the at least one control parameter at different times controls the at least one filter with different values of the at least two control parameters at different times.

12. An apparatus for echo cancellation of a two-way audio communication, comprising:
one or more processors; and
one or more memories storing instructions that, when executed by the one or more processors, cause the apparatus to perform at least the following:
receive, at an adaptive echo cancellation system from one or more microphones, an audio signal based on, at least in part, near-end signals and reproduced far-end signals, wherein one or more loudspeakers reproduced the far-end signals;
operate the adaptive echo cancellation system, at least in part, with at least one filter so as to update estimates of coefficients of an acoustic channel from the one or more loudspeakers to the one or more microphones;
determine at least two control parameters affecting an operation of the adaptive echo cancellation system that are configurable and are set to corresponding at least one values, from a range of values and a characteristic of the near-end signals, wherein the determining the at least two control parameters determines for each of the at least two control parameters an estimated accuracy of estimates of a different subset of coefficients of the acoustic channel; and
control, by the adaptive echo cancellation system, the at least one filter with different values of the at least two control parameters at different times.

13. The apparatus according to claim 12, wherein the at least two control parameters comprise a control parameter that affects a rate of change of corresponding estimates of coefficients of the acoustic channel and comprise a control parameter based on updating different filter coefficients with corresponding weights proportional to magnitudes of the different filter coefficients.

14. The apparatus according to claim 13, wherein the estimated accuracy of estimates for the control parameter based on updating different filter coefficients with corresponding weights proportional to magnitudes of the different filter coefficients comprises an estimate of the accuracy of a coefficient where a small coefficient is considered to be accurate while a large coefficient is considered not to be as accurate.

15. The apparatus according to claim 14, wherein the acoustic channel is sparse.

16. The apparatus according to claim 13, wherein:
the determining and controlling are for a first procedure;
the audio signal comprises a sequence of samples;
a second procedure determines the at least two control parameters based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and
the one or more memories further store instructions that, when executed by the one or more processors, cause the apparatus to choose, based on one or more criteria, whether to use the first procedure or the second procedure for a time period.

17. The apparatus according to claim 16, wherein the associated subset of samples is a block of samples and subsets of samples in previous updates are corresponding blocks of samples, the blocks have a same number of samples, updating the coefficients of the at least one filter occurs at multiples of the number of samples in the block, and the coefficients of the at least one filter are kept fixed during times between when blocks are used for the updating.

18. The apparatus according to claim 12, wherein multiple loudspeakers reproduced the far-end signals, and wherein the acoustic channel comprises multiple subchannels, each associated with a different one of the multiple loudspeakers, and each of the at least two control parameters corresponds to one of the multiple subchannels.

19. The apparatus according to claim 18, wherein:
the determining and controlling are for a first procedure;
the audio signal comprises a sequence of samples;
a second procedure determines the at least two control parameters based on estimating an accuracy of the estimates of the coefficients of the acoustic channel, and on updating the coefficients of the at least one filter based on an associated subset of samples from the sequence, where the associated subset of samples includes at least two samples not included in any subsets of samples associated with a previous update of the coefficients of the at least one filter; and the one or more memories further store instructions that, when executed by the one or more processors, cause the apparatus to choose, based on one or more criteria, whether to use the first procedure or the second procedure for a time period.

20. The apparatus according to claim 19, wherein the associated subset of samples is a block of samples and subsets of samples in previous updates are corresponding blocks of samples, the blocks have a same number of samples, updating the coefficients of the at least one filter occurs at multiples of the number of samples in the block, and the coefficients of the at least one filter are kept fixed during times between when blocks are used for the updating.

* * * * *